US 8,195,800 B2

(12) United States Patent
Tameshige et al.

(10) Patent No.: US 8,195,800 B2
(45) Date of Patent: Jun. 5, 2012

(54) COMPUTER RESOURCE DISTRIBUTION METHOD BASED ON PREDICTION

(75) Inventors: Takashi Tameshige, Kawasaki (JP);
Yoshifumi Takamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 12/334,736

(22) Filed: Dec. 15, 2008

(65) Prior Publication Data

US 2009/0113056 A1 Apr. 30, 2009

Related U.S. Application Data

(63) Continuation of application No. 10/951,813, filed on Sep. 29, 2004, now Pat. No. 7,500,001.

(30) Foreign Application Priority Data

Nov. 10, 2003 (JP) ................................. 2003-379291

(51) Int. Cl.
*G06F 15/16* (2006.01)
*G06F 15/173* (2006.01)
*G06Q 10/10* (2006.01)

(52) U.S. Cl. ........................ 709/225; 709/203; 705/1.1

(58) Field of Classification Search ................... 709/225
See application file for complete search history.

(56) References Cited

U.S. PATENT DOCUMENTS

| 6,434,380 | B1 | 8/2002 | Andersson et al. |
| 6,516,350 | B1 * | 2/2003 | Lumelsky et al. ............ 709/226 |
| 6,721,322 | B1 * | 4/2004 | Lakhani et al. ............ 370/395.1 |
| 7,085,837 | B2 | 8/2006 | Kimbrel et al. |
| 7,249,179 | B1 | 7/2007 | Romero et al. |
| 7,721,289 | B2 * | 5/2010 | Remany et al. ............... 718/104 |
| 2001/0025312 | A1 | 9/2001 | Obata |
| 2001/0034752 | A1 * | 10/2001 | Kremien ........................ 709/105 |
| 2002/0143945 | A1 * | 10/2002 | Shahabuddin et al. ........ 709/226 |
| 2003/0074606 | A1 * | 4/2003 | Boker ............................. 714/42 |
| 2004/0111508 | A1 | 6/2004 | Dias et al. |
| 2004/0111509 | A1 | 6/2004 | Eilam et al. |
| 2005/0071211 | A1 * | 3/2005 | Flockhart et al. ................. 705/8 |
| 2007/0002747 | A1 * | 1/2007 | Matsumoto et al. ........ 370/236.1 |

FOREIGN PATENT DOCUMENTS

| JP | 06231091 | 8/1994 |
| JP | 981409 | 3/1997 |
| JP | 11328129 | 11/1999 |
| JP | 2001209627 | 8/2001 |

* cited by examiner

*Primary Examiner* — Peling Shaw
*Assistant Examiner* — Joiya Cloud
(74) *Attorney, Agent, or Firm* — Brundidge & Stanger, P.C.

(57) ABSTRACT

A resource distribution method capable of lending surplus resources among a plurality of services and reducing the maintenance cost of the surplus resources is provided. Computer resources in the standby system have a dead standby state in which at least an application is not installed. A plurality of services or a plurality of users share the computer resources in the standby system. As a result, improvement of the utilization factor of idle computer resources and server integration are implemented, and the cost required to maintain the computer resources is reduced. Furthermore, load prediction is conducted as regards individual services by using past operation history. Idle computer resources secured from services having surplus and maintained are thrown in according to a result of the prediction.

6 Claims, 29 Drawing Sheets

FIG. 3

| STATE / ITEM | | ACTIVE SYSTEM | STANDBY SYSTEM | | |
|---|---|---|---|---|---|
| | | ACTIVE | HOT STANDBY | COLD STANDBY | DEAD STANDBY |
| POWER SUPPLY | | ON | ON | ON/OFF | ON/OFF |
| INSTALL | OS | DONE | DONE | DONE | DONE/ UNDONE |
| | APPLICATION | DONE | DONE | DONE | UNDONE |
| APPLICATION START | | Up | Up | Down | — |
| BUSINESS/SERVICE EXECUTION | | ○ | × | × | × |
| | | 301 | 302 | 303 | 304 |

FIG. 7A

| | | | | | |
|---|---|---|---|---|---|
| POLICY DB | | | | | |
| EVENT NAME | THRESHOLD | ACTION | PRIORITY | STATE SHIFT | SCHEDULE RESERVATION |
| CPU UTILIZATION FACTOR | >70% | SERVER,+1 | 1 | 1. HOT STANDBY -> ACTIVE<br>2. DEAD STANDBY -> ACTIVE | 1. 90 sec LATER<br>2. 0 sec LATER |
| CPU UTILIZATION FACTOR | >70% | SERVER,+1 | 2 | 1. DEAD STANDBY -><br>    HOT STANDBY<br>2. ----------- | 1. 5 sec LATER<br>2. ----------- |
| CPU UTILIZATION FACTOR | <10% &<br>ACTIVE>1 | SERVER,-1 | 1 | 1. ACTIVE -> DEAD STANDBY<br>2. ACTIVE -> HOT STANDBY | 1. 60 sec LATER<br>2. 60 sec LATER |
| CPU UTILIZATION FACTOR | <10% &<br>ACTIVE>1 | SERVER,-1 | 2 | 1. -----------<br>2. HOT STANDBY -><br>    DEAD STANDBY | 1. 60 sec LATER<br>2. AFTER SHIFT CONFIRMATION |
| ⋮ | ⋮ | ⋮ | ⋮ | ⋮ | ⋮ |
| NETWORK UTILIZATION FACTOR | >80% | NETWORK,+1 | 1 | DEAD STANDBY -> ACTIVE | 5 sec LATER |
| NETWORK UTILIZATION FACTOR | <20% &<br>ACTIVE>1 | NETWORK,-1 | 1 | ACTIVE -> DEAD STANDBY | 100 sec LATER |
| ⋮ | ⋮ | ⋮ | ⋮ | ⋮ | ⋮ |
| STORAGE UTILIZATION FACTOR | >80% | STORAGE,+1 | 1 | 1. HOT STANDBY -> ACTIVE<br>2. DEAD STANDBY -> ACTIVE | 1. 60 sec LATER<br>2. 10 sec LATER |
| ⋮ | ⋮ | ⋮ | ⋮ | ⋮ | ⋮ |
| 701 | 702 | 703 | 704 | 705 | 706 |

FIG. 7B

| | | | POLICY DB | | |
|---|---|---|---|---|---|
| EVENT NAME | THRESHOLD | ACTION | PRIORITY | STATE SHIFT | SCHEDULE RESERVATION |
| BIT ERROR IN MEMORY | >1000bit | SERVER, +1 | 1 | 1. HOT STANDBY -> ACTIVE<br>2. DEAD STANDBY -> ACTIVE | 1. 90 sec LATER<br>2. 0 sec LATER |
| BIT ERROR IN MEMORY | >1000bit | SERVER, +1 | 2 | 1. DEAD STANDBY -><br>    HOT STANDBY<br>2. ------------------ | 1. 5 sec LATER<br>2. ------------ |
| BIT ERROR IN MEMORY | >1000bit | SUBJECT SERVER, -1 | 3 | ACTIVE -> DEAD STANDBY | AFTER FAIL OVER |
| ⋮ | ⋮ | ⋮ | ⋮ | ⋮ | ⋮ |
| | | | | | |
| | | | | | |
| | | | | | |
| | | | | | |
| | | | | | |

| | | | RESOURCE ASSIGNMENT REQUEST | | |
|---|---|---|---|---|---|
| PRIORITY | USER | THE NUMBER OF RE- SOURCES | RESOURCE NAME | STATE SHIFT | SCHEDULE RESERVA- TION |
| 1 | A | +1 | SERVER | DEAD STANDBY -> HOT STANDBY | 90 sec LATER |
| 2 | B | +2 | SERVER | HOT STANDBY -> ACTIVE | 5 sec LATER |
| | | +2 | SERVER | DEAD STANDBY -> HOT STANDBY | 0 sec LATER |
| 2 | C | −1 | SERVER | ACTIVE -> HOT STANDBY | 60 sec LATER |
| | | −1 | SERVER | HOT STANDBY -> DEAD STANDBY | 90 sec LATER |
| 1 | C | −1 | SERVER | ACTIVE -> DEAD STANDBY | 60 sec LATER |
| 1 | D | +1 | NETWORK | DEAD STANDBY -> ACTIVE | 5 sec LATER |
| 1 | E | +1 | STORAGE | DEAD STANDBY -> ACTIVE | 5 sec LATER |
| ⋮ | ⋮ | ⋮ | ⋮ | ⋮ | ⋮ |
| 1 | F | +30% | CPU | DEAD STANDBY -> ACTIVE | 5 sec LATER |
| 2 | F | +40% | MEMORY | DEAD STANDBY -> ACTIVE | 5 sec LATER |
| ⋮ | ⋮ | ⋮ | ⋮ | ⋮ | ⋮ |
| | | | | | |

| DISTRIBUTION RESOURCE DETERMINATION | | | | | | | |
|---|---|---|---|---|---|---|---|
| PRIORITY | USER | THE NUMBER OF RE-SOURCES | RESOURCE NAME | INSTALL & SET | PORT | STATE SHIFT | SCHEDULE RESERVATION |
| 1 | A | +1 | SERVER | Web | 20 | DEAD STANDBY -> HOT STANDBY | 90 sec LATER |
| 2 | B | +2 | SERVER | Web OS/Web | 9 10 | HOT STANDBY -> ACTIVE | 5 sec LATER |
| | | +2 | SERVER | Web OS/Web | 21 22 | DEAD STANDBY -> HOT STANDBY | 0 sec LATER |
| 2 | C | -1 | SERVER | — | 2 | ACTIVE -> HOT STANDBY | 60 sec LATER |
| | | -1 | SERVER | — | 11 | HOT STANDBY -> DEAD STANDBY | 90 sec LATER |
| 1 | C | -1 | SERVER | — | 3 | ACTIVE -> DEAD STANDBY | 60 sec LATER |
| 1 | D | +1 | NETWORK | Ethernet | 9<->20 | DEAD STANDBY -> ACTIVE | 5 sec LATER |
| 1 | E | +1 | STORAGE | DB | 8<->14 | DEAD STANDBY -> ACTIVE | 5 sec LATER |
| ⋮ | ⋮ | ⋮ | ⋮ | ⋮ | ⋮ | ⋮ | ⋮ |
| 1 | F | +30% | CPU | — | — | DEAD STANDBY -> ACTIVE | 5 sec LATER |
| 2 | F | +40% | MEMORY | — | — | DEAD STANDBY -> ACTIVE | 5 sec LATER |
| ⋮ | ⋮ | ⋮ | ⋮ | ⋮ | ⋮ | ⋮ | ⋮ |
| | | | | | | | |

| RESOURCE MANAGEMENT TABLE | | | | | |
|---|---|---|---|---|---|
| RESOURCE NAME | USER | KIND | PORT | STATE | RESERVATION |
| SERVER 1 | A | Web, OS | 0~2 | ACTIVE | 9:00 – 10:00 MAINTENANCE |
| SERVER 2 | A | Web, OS APPLICATION, OS | 3~5 | ACTIVE | 12:00 – Web |
| SERVER 3 | A | DB, OS | 6~8 | ACTIVE | NONE |
| SERVER 4 | – | – | – | DEAD STANDBY | NONE |
| ⋮ | ⋮ | ⋮ | ⋮ | ⋮ | ⋮ |
| NETWORK 1 | A | Ethernet | 9<->8 | ACTIVE | NONE |
| NETWORK 2 | B | Fiber Channel | 7<->10 | ACTIVE | NONE |
| ⋮ | ⋮ | ⋮ | ⋮ | ⋮ | ⋮ |
| STORAGE 1 | A | DB | 6<->1 | ACTIVE | 9:00 – MAINTENANCE |
| STORAGE 2 | A | DB | 7<->2 | HOT STANDBY | 9:00 – ACTIVE |
| STORAGE 3 | B | DB | 10<->3 | ACTIVE | NONE |
| ⋮ | ⋮ | ⋮ | ⋮ | ⋮ | ⋮ |

1101　1102　1103　1104　1105　1106

COMPUTER RESOURCE DISTRIBUTION METHOD BASED ON PREDICTION

CROSS-REFERENCE TO RELATED APPLICATIONS

The present application is a continuation of application Ser. No. 10/951,813, filed Sep. 29, 2004 now U.S. Pat. No. 7,500,001; which claims priority from Japanese application JP 2003-379291 filed on Nov. 10, 2003, the content of which is hereby incorporated by reference into this application.

BACKGROUND OF THE INVENTION

The present invention provides a method for automatically shifting computer resources from a standby system to an active system by using a prediction technique.

In recent years, outsourcing with the object of reducing the necessary expense is proceeding in purchase, supply and maintenance of service, software and infrastructures. Computer use of "on demand" type has been proposed. In the computer use of "on demand" type, necessary computer resources are used when needed, and a charge is paid according to the amount used. Outsourcing to computer centers having a large quantity of computer resources represented by conventional computer centers such as data centers and utility centers is proceeding. It is considered that this movement will be further accelerated by application of the grid computing technique to the business field. Here, the maintenance of idle computer resources and a resultant cost pose a problem. In the conventional computer operation, computer resources are introduced in expectation of specifications at the time of maximum operation needed instantaneously. Usually, therefore, a large number of idle computer resources are present. Maintaining the computer resources constitutes a barrier to the cost reduction. In a method disclosed in JP-A-9-81409, a computer has an active system and a standby system. A standby system processing function that can be automatically associated when a fault has occurred is selected and associated. A hot standby relation is constructed, and the standby system becomes an active system for another computer. Since the standby system can become an active system for another computer in this method, it becomes possible to implement reduction of standby system resources and reduction of idle computer resources. In a method disclosed in JP-11-328129, only resources shared by all jobs are connected and it is made possible to cope with any execution system job. As a result, the number of standby system jobs in the system is reduced, and it is attempted to use resources efficiently as regards computers and memories and reduce the system operation load and cost.

In the conventional techniques, other services are not operated on the same server. Therefore, the total number of servers cannot be decreased in the form of, for example, server integration. The same holds true for computer resources other than servers. In the case where the load varies depending upon the time zone, it is necessary to prepare enough computer resources to withstand a high load and it is difficult to reduce computer resources. In addition, since the standby system becomes a computer resource group always having the same setting as that of the active system in the conventional technique, it is necessary to maintain a standby system every service and it is difficult to reduce the computer resources. Furthermore, since overload in computer resources of the active system is predicted in the conventional technique on the basis of the current load value, precision of resource scheduling is low. In that respect as well, it is difficult to form a configuration in which surplus resources are mutually lent among a plurality of services.

SUMMARY OF THE INVENTION

An object of the present invention is to provide a resource distribution method that makes it possible to mutually lend surplus computer resources among a plurality of services, reduce the total number of computer resources, and reduce the maintenance cost of the surplus resources.

Specifically, another object of the present invention is to provide a resource distribution method that makes it possible to improve the precision of the resource scheduling, and thereby conduct efficient distribution.

In order to achieve the objects, the standby system is operated in the range of dead standby to hot standby. The hot standby means a state in which an application is started with the same setting as the active system. In the hot standby state, service in the active system can be taken over at any time. The dead standby means a state in which at least an application is not deployed. By deploying the application or an OS (Operating System), the dead standby can become a standby system for any service. By automatically shifting a state in the standby system to various standby states, it becomes possible for different services or different users to share computer resources and the total computer resources that must be maintained can be reduced. Furthermore, by referring to the past history in the prediction, services capable of lending servers are narrowed down. After a decision concerning server lending, therefore, the precision of a decision whether the service in the lending destination tends to rise or tends to fall can be improved. Furthermore, by specifying time when the load increases and the expected load, scheduling including the time for deployment becomes possible. Furthermore, by detecting the periodicity, it becomes possible to identify services that can lend servers preferentially and identify services that should be avoided in lending. Since it becomes possible to provide resources not only from the standby system (server pool) but also from other services by applying the prediction technique to all services, it becomes possible to suppress an increase of the initial cost caused by addition of new resources.

According to the present invention, it becomes possible for a plurality of services or a plurality of users to share servers. Furthermore, when a computer resource pool is formed, the use efficiency of computer resources can be improved. By applying the prediction technique to not only services lacking resources but also all other services, it is possible to not only maintain the service level of a single service but also improve the service levels of all services. Since services found to have remaining power by using the prediction technique provide resources, an effect of suppressing the increase of the initial cost caused by addition of new resources is obtained.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing details concerning an active system and a standby system in a first embodiment;

FIG. 7A is a diagram showing contents of a database described in a policy DB in a first embodiment;

FIG. 7B is a diagram showing contents of a database described in a policy DB in a first embodiment;

FIG. 9 is a table showing resource assignment requests executed in a resource assignment mechanism;

FIG. 10 is a table showing distribution resource determination conducted in a resource assignment mechanism;

FIG. 11 is a table showing contents described in a resource management table;

DETAILED DESCRIPTION OF THE EMBODIMENTS

First Embodiment

Hereafter, a first embodiment of the computer resource distribution method based on the prediction technique will be described in detail with reference to the drawings.

Figure 1:
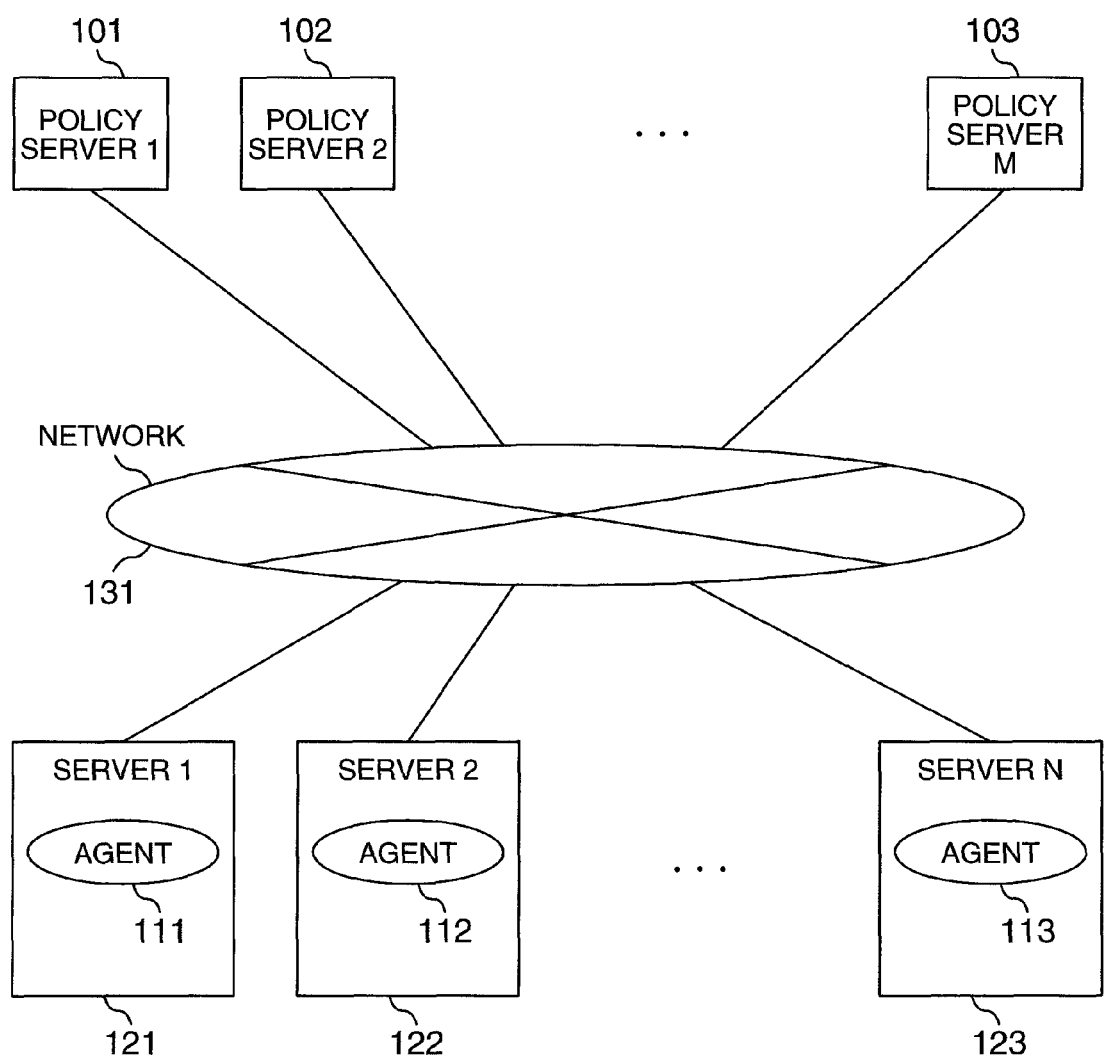
FIG. 1 is a block diagram showing an outline of a program remote execution method.

FIG. 1 shows how a plurality of policy servers 101, 102 and 103 are connected to a plurality of servers 121, 122 and 123 respectively having agents 111, 112 and 113 via a network 131 according to the computer resource distribution method based on prediction according to the present invention.

Figure 2:
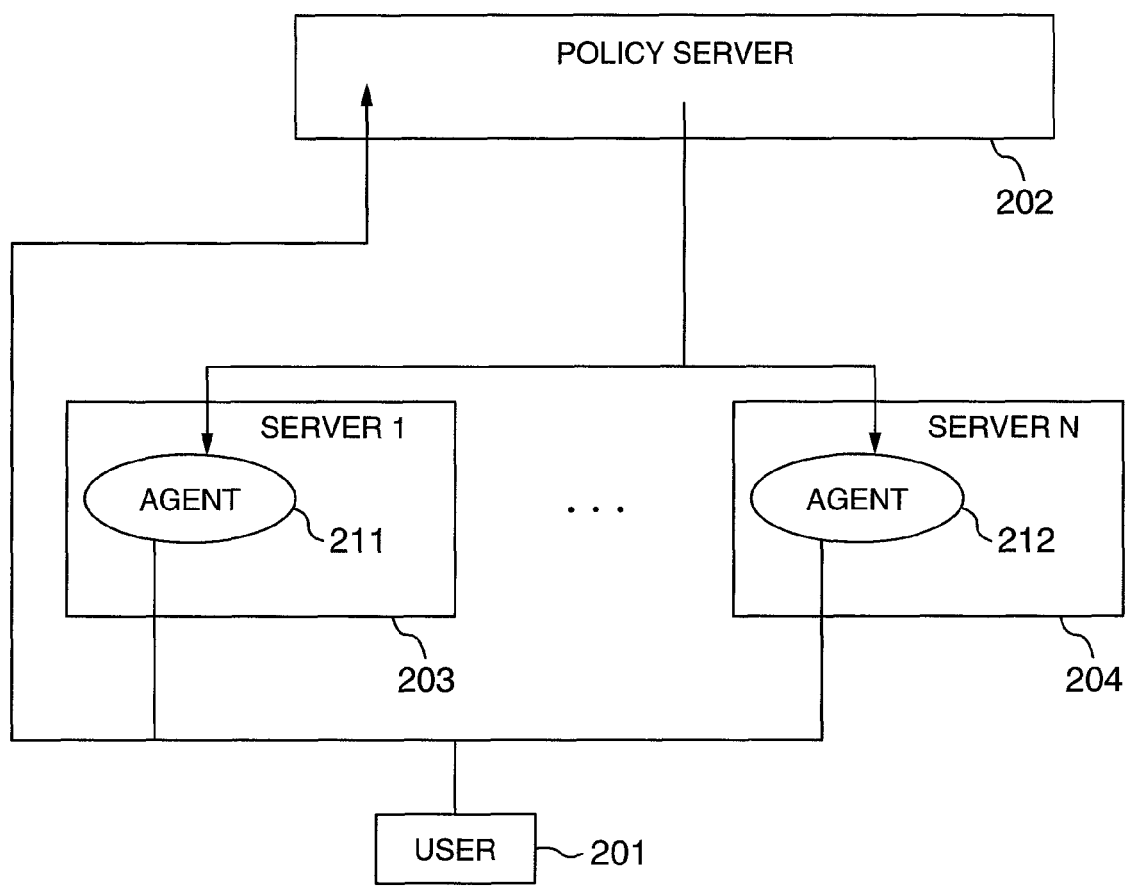
FIG. 2 is a block diagram showing a general configuration of a first embodiment according to the present invention.

FIG. 2 is a schematic configuration diagram for the computer resource distribution method using a prediction technique according to the present invention. Reference numeral 201 denotes a user who utilizes a computer environment. A policy server 202 receives event information issued by the user 201 and agents 211 and 212 respectively in servers 203 and 204 (a schedule, load prediction, fault prediction and maintenance of the servers, and hardware information and software information issued by the agents 211 and 212). The policy server predicts loads and faults in the servers 203 and 204, and determines states of an active system and a standby system in the servers 203 and 204. The states indicate not only whether each server is an active system server or a standby system server, but also which application is operated on which OS and a standby method (power supply, an OS, an application, and whether an application is started) for a standby server. As for the standby, there are hot standby, cold standby and dead standby (which is standby other than the hot standby and the cold standby, and standby in which at least an application is not installed). In the hot standby, the standby system is in the standby state with power on and with the same setting as that in the active system, and an application is already started. Therefore, it is possible to take over the service of the active system instantaneously. As a matter of course, the same OS and application as those of the active system are already installed. On the other hand, in the cold standby, power may be either on or off, and an application is not started. However, the same OS and application as those in the active system are already installed, and various kinds of setting are already set. Therefore, it is possible to take over the service of the active system by turning on power and starting the OS and application. As compared with the hot standby, however, it takes a time until taking over. Instead, the power dissipation can be kept down. In the dead standby state, at least an application is not installed. For taking over the service in the active system, therefore, it is necessary to install a necessary OS and a necessary application and conduct executable setting. The greatest advantage of preparing the dead standby is that any service can be started by installing a necessary OS and a necessary application and conducting executable setting. As a result, computer resources can be shared among a plurality of services or a plurality of users. In other words, server integration can be conducted in the case of servers, and idle computers can be reduced. Details of the active system and the standby system are shown in FIG. 3.

FIG. 3 shows details concerning the active system and the standby system. The active system is in a state called active, and its features are shown in a column 301. State of the standby system can be classified into the hot standby state shown in a column 302, the cold standby state shown in a column 303, and the dead standby state, which is a state other than the hot standby and cold standby states. A column 304 shows an example of the dead standby state. The dead standby state can be characterized as a state in which at least the application is not installed.

Figure 4:
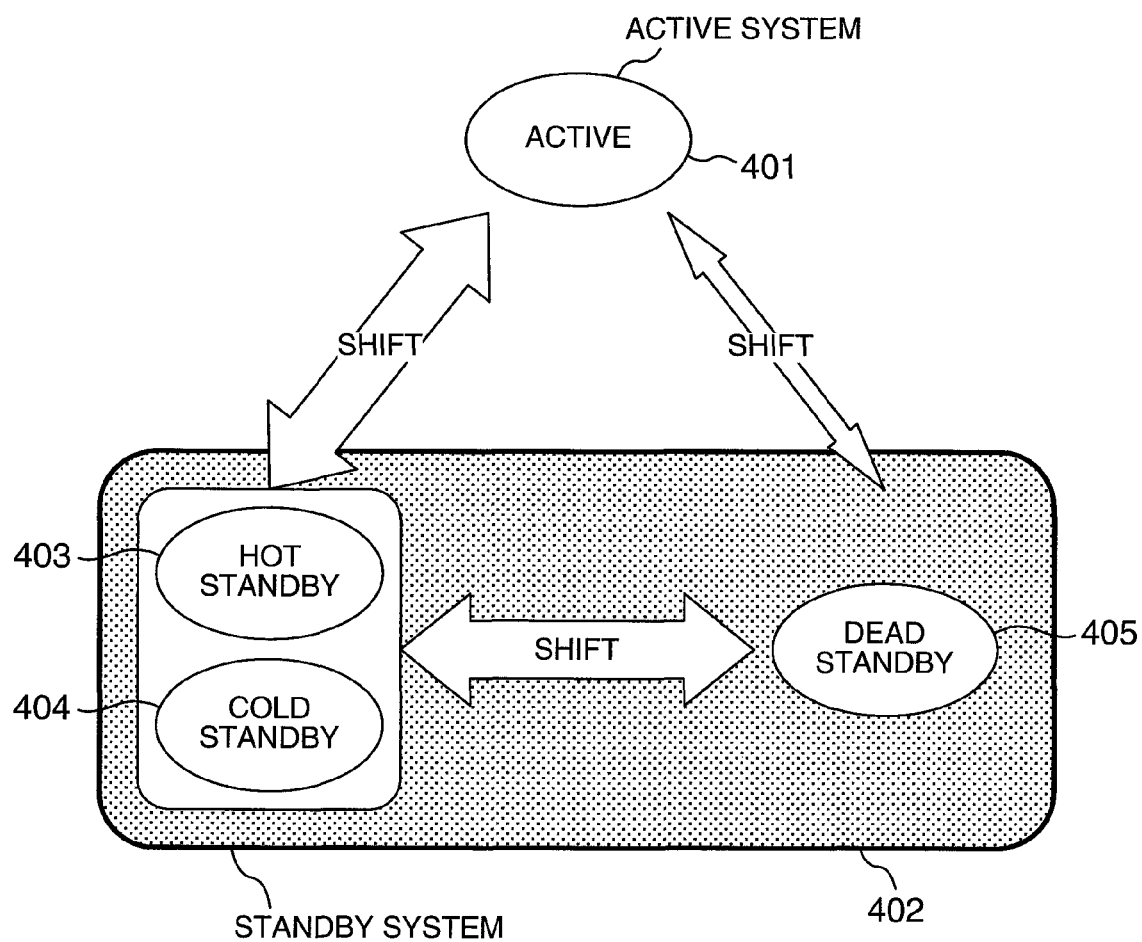
FIG. 4 is a conceptual diagram showing details of lending conducted between an active system and a standby system in a first embodiment.

FIG. 4 shows details concerning the shift between the active system and the standby system. An active system 401 is formed of an operation state called active. On the other hand, a standby system is formed of a hot standby 403, a cold standby 404, and a dead standby 405, which is another state. Each state is shifted among the active state, the hot standby state 403, the cold standby state 404 and the dead standby state 405. A shift is conducted even between the hot standby state 403 and the cold standby state 404. Computer resources in the dead standby state are shared by a plurality of services or a plurality of users. Therefore, a service or a user needing a resource in the dead standby state can suitably shift the computer resource in the dead standby state to the active state, the hot standby state 403 or the cold standby state 404, and use the computer resource.

Figure 5:
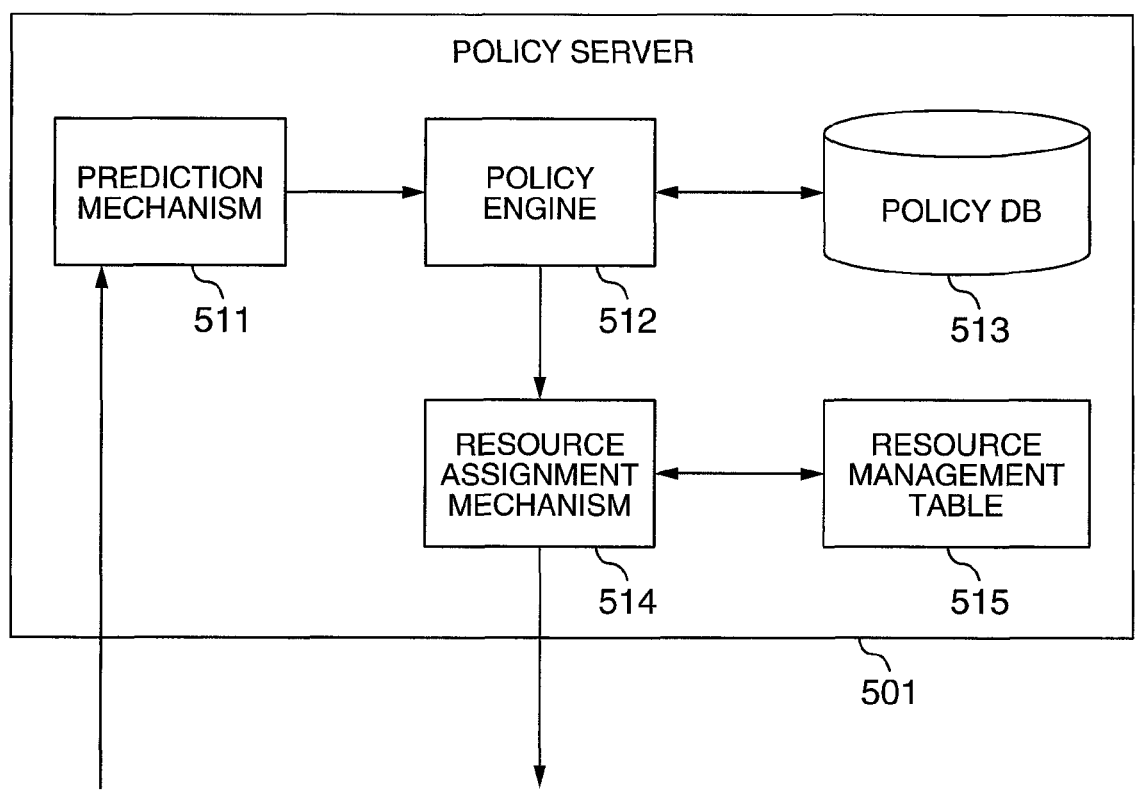
FIG. 5 is a function block diagram showing details of functions included in a policy server in a first embodiment.

FIG. 5 shows details of functions included in a policy server 501. A prediction mechanism 511 predicts the future computer load and computer fault on the basis of event information issued by the user 201 or the agent 211 or 212. In the case of load prediction, a method of deriving a future value on the basis of an analytical numerical expression, a past value and a current value, a method of deriving a future value by using a load prediction table, and a method of determining a future value by preparing some templates are conceivable. In the case of fault prediction, a computer resource in which a fault might occur can be extracted in the same way as the load prediction. "Bit error in memory" described in "Event name" shown in FIG. 7B is an example of a factor on the basis of which a fault is predicted. Information concerning the load and fault predicted by the prediction mechanism 511 is sent to a policy engine 512. By referring to the sent information and a policy DB (Data Base) 513, the policy engine 512 issues a resource assignment request to a resource assignment mechanism 514. Details of the policy DB referred to are shown in FIGS. 7A and 7B.

Figure 6:
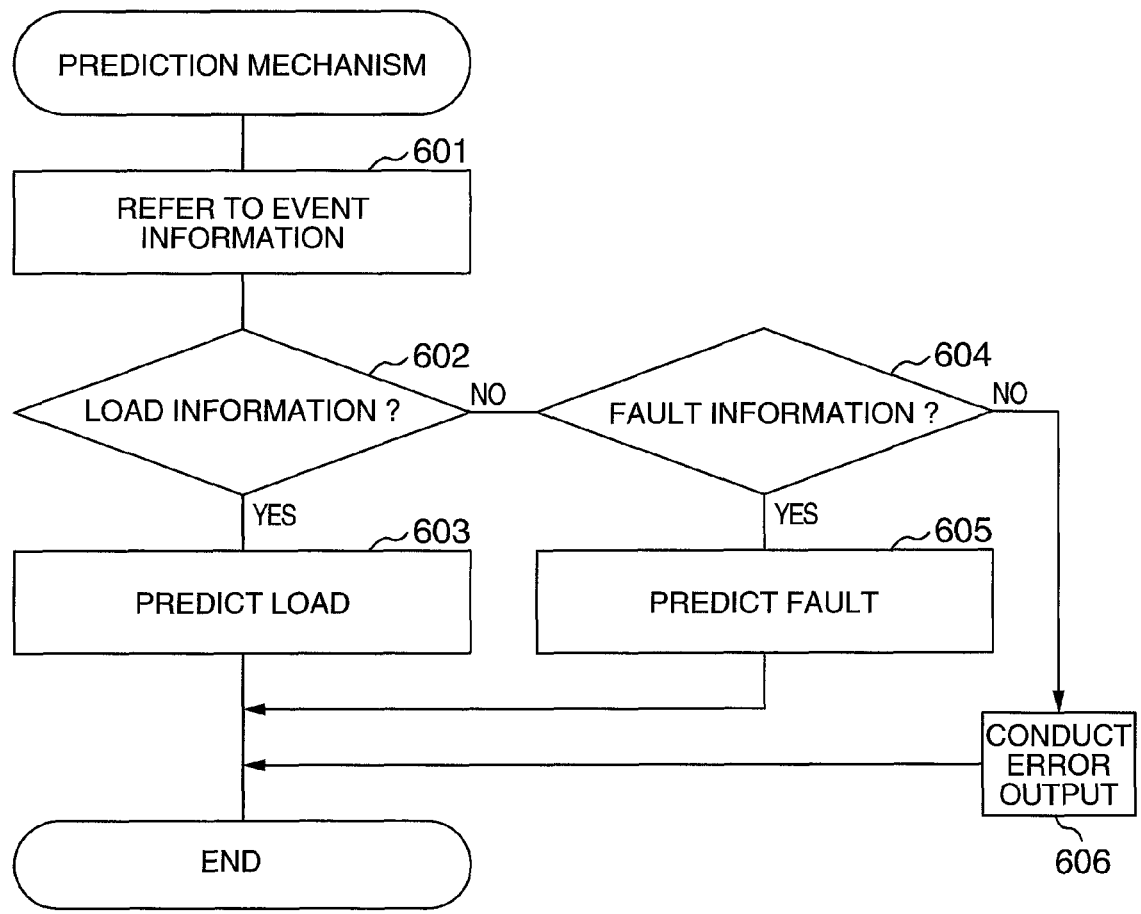
FIG. 6 is a flow chart showing a processing flow in a prediction mechanism in a first embodiment.

FIG. 6 shows a processing flow in the prediction mechanism 511. At step 601, event information is referred to. If predicted information is given explicitly from the user, processing in the prediction mechanism 511 is finished as an exception and the processing is shifted to the policy engine 512. It is determined at step 602 whether the event information is information concerning the load. If the event information is information concerning the load, prediction of the future load is conducted at step 603. At this time, current or past hardware information and software information are referred to as the log in some cases. If the event information is judged at the step 602 not to be information concerning the load, it is determined at step 604 whether the event information is information concerning a fault. If the event information is information concerning a fault, prediction of a future fault is conducted at step 605. At this time, current or past hardware information and software information are referred to as the log in the same way as the prediction concerning the load, in some cases. If the event information is judged at the step 604 not to be information concerning a fault, error output is conducted at step 606.

FIGS. 7A and 7B show database contents described in the policy DB 513. In each of columns 701 and 711, event information issued by the user 201 or the agent 211 is shown. In each of columns 702 and 712, a threshold and a condition at which and under which the policy engine 512 takes action for each event are shown. In each of columns 703 and 713, a resource that becomes a subject of each action taken by the policy engine 512 and its operation are shown. In each of columns 704 and 714, a priority concerning operation in the case where the columns 701 (711), 702 (712) and 703 (713) have the same conditions is shown. A priority over the whole policy DB 513 may be described in each of the columns 704 and 714. In each of columns 705 and 715, orders concerning state shifts shown in FIG. 4 are shown. For one event, a plurality of choices may be prepared with priorities so as to be able to be selected by the policy engine 512. In that case, events associated by being provided with priority in the columns 704 and 714 must be associated as shown in FIGS. 7A and 7B. In each of columns 706 and 716, a schedule for taking action with respect to each event is shown. In each of columns 706 and 716, not only time when an action is to be taken but also a conditional statement such as "after shift confirmation" or "after fail over" may be described. If choices are prepared in the columns 705 and 715, they relate to the columns 706 and 716, and consequently they must be associated.

Figure 8:
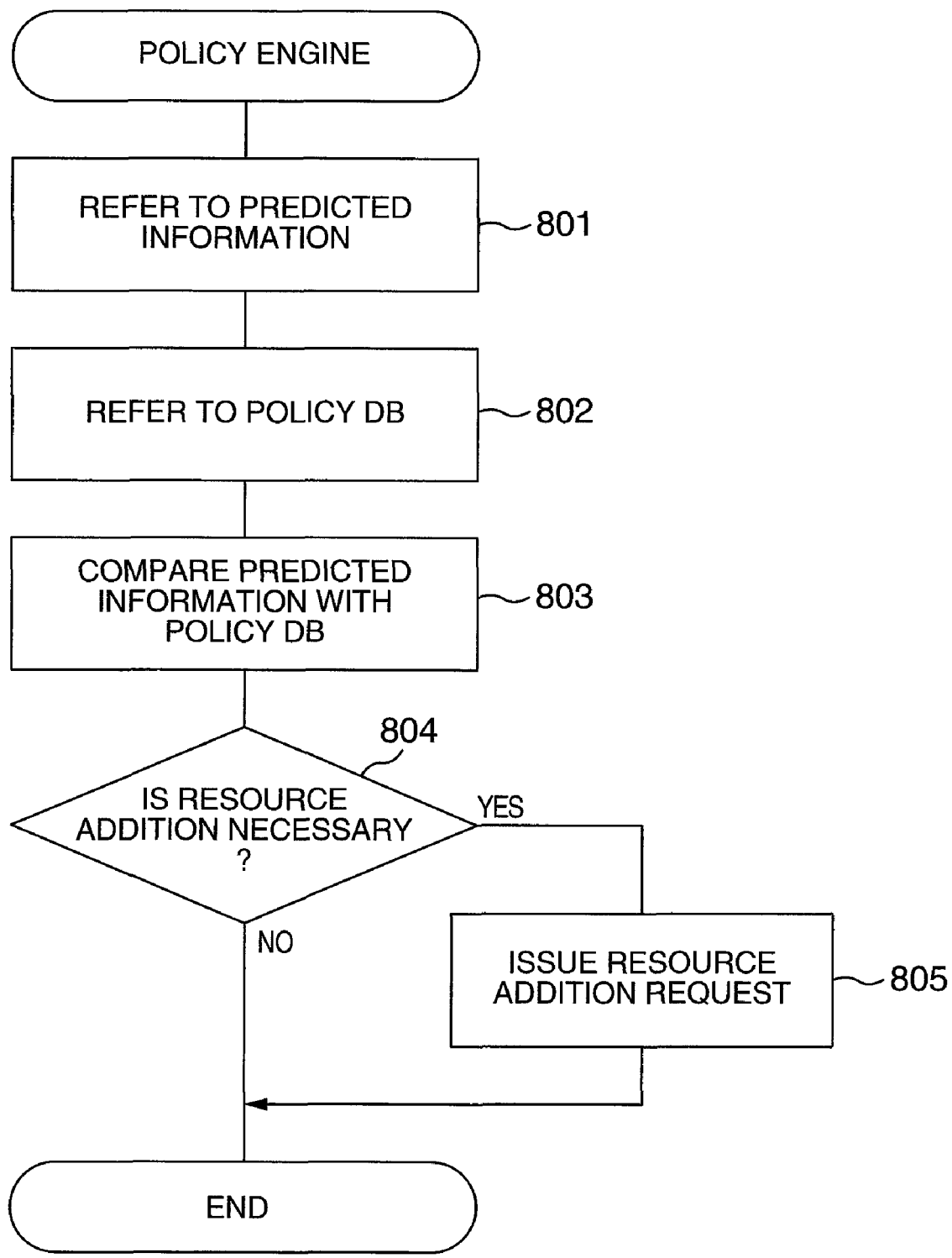
FIG. 8 is a flow chart showing a processing flow in a policy engine.

FIG. 8 shows a processing flow in the policy engine 512. At step 801, predicted information output from the prediction mechanism 511 is referred to at step 801. At step 802, the policy DB 513 is referred to, and information shown in FIGS. 7A and 7B is confirmed. At step 803, the predicted information referred to at the step 801 is compared with the policy DB referred to at the step 802. At step 804, it is determined on the basis of the comparison executed at the step 803 whether it is necessary to change the resource state. If the change is judged at the step 804 to be necessary, the policy engine 512 outputs a resource assignment request for changing the resource state to the resource assignment mechanism 514.

FIG. 9 shows resource assignment requests executed in the resource assignment mechanism 514. A column 901 indicates a priority of each resource assignment request. A column 902 indicates a user who has issued each resource assignment request. A column 903 indicates the number of resources for which each resource assignment request has been issued. A column 904 indicates a kind of resources for which each resource assignment request has been issued. A column 905 indicates a state shift caused by each resource assignment request. A column 906 indicates a schedule ranging from execution of each resource assignment request to execution. In the column 906, not only time when an action is to be taken but also a conditional statement such as "after shift confirmation" or "after fail over" might be described.

FIG. 10 shows distribution resource determination executed in the resource assignment mechanism 514. In addition to the columns 901, 902, 903, 904, 905 and 906 shown in FIG. 9, a column 1005 and a column 1006 are associated. The column 1005 indicates an OS and an application to be installed and set for execution. The column 1006 indicates a port to be used. The resource assignment mechanism 514 has a function of converting a resource assignment request shown in FIG. 9 to a distribution resource determination shown in FIG. 10 with reference to a resource management table 515 shown in detail in FIG. 11.

FIG. 11 shows contents described in the resource management table 515. A column 1101 indicates a kind of a resource. A column 1102 indicates a user who is using the resource. Here, a plurality of users may use one resource. A column 1103 indicates additional information that accompanies each resource. Performance information of each resource may also be described. In the case of a server, its installed OS and application and version information accompanying them are indicated. In the case of a network, a kind and a transfer rate of its cable are described. In the case of a storage, its use is described. A column 1104 indicates a port number used by each resource. For example, a port of a hub, switch or load distribution apparatus becomes its subject. A column 1105 indicates a state of each resource. In the column 1105, "active," "hot standby," "cold standby," or "dead standby," which represents whether each resource is in the active system or standby system, is described. A column 1106 indicates reservation information concerning each resource. If it is desired to conduct maintenance with time specified, it is described in this column 1106. Also in the case where it is desired to cause a state shift with time specified, it is described in this column 1106.

Figure 12:
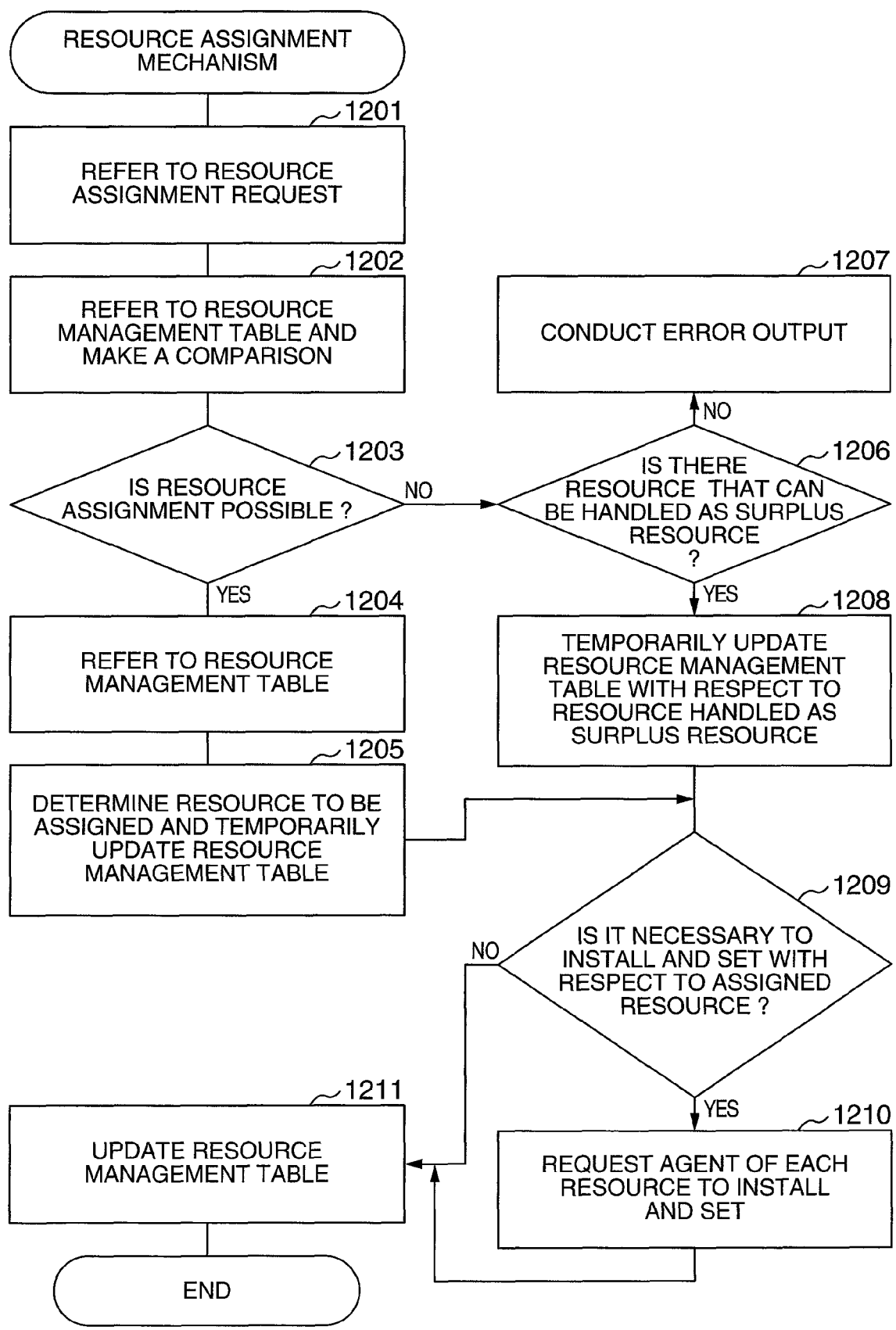
FIG. 12 is a flow chart showing a processing flow in a resource assignment mechanism.

FIG. 12 shows a processing flow in the resource assignment mechanism 514. At step 1201, a resource assignment request issued by the policy engine 512 is referred to. At step 1202, the resource management table 515 is referred to, and the resource management table 515 is compared with the resource assignment request referred to at the step 1201. At step 1203, it is determined whether resource assignment is possible. If the resource assignment is possible, the resource management table 515 is referred to at step 1204. At step 1205, the resource assignment mechanism determines a resource to be assigned, conducts the distribution resource determination as shown in FIG. 10, and temporarily changes the "state" indicated in the column 1105 in the resource management table 515 shown in FIG. 11 to "under update." If the resource assignment is judged at the step 1203 to be impossible, it is determined at step 1206 whether there is a resource that can be handled as a surplus resource. If a resource that can be handled as a surplus resource is not present, error output is conducted at step 1207 and the processing is finished. If a resource can be handled as an idle resource, the "state" 1105 in FIG. 11 in the resource management table 515 is temporarily changed to "under update" for the resource handled as a surplus resource at step 1208. At step 1209, it is determined whether it is necessary to install an OS and an application or conduct setting required for execution, with respect to the assigned resource. If necessary, the resource assignment mechanism 514 requests the agent 211 or 212 of each resource to install an OS and an application and conduct setting required for execution at step 1210. When all work is completed, the resource management table 515 is updated at step 1211.

Figure 13:
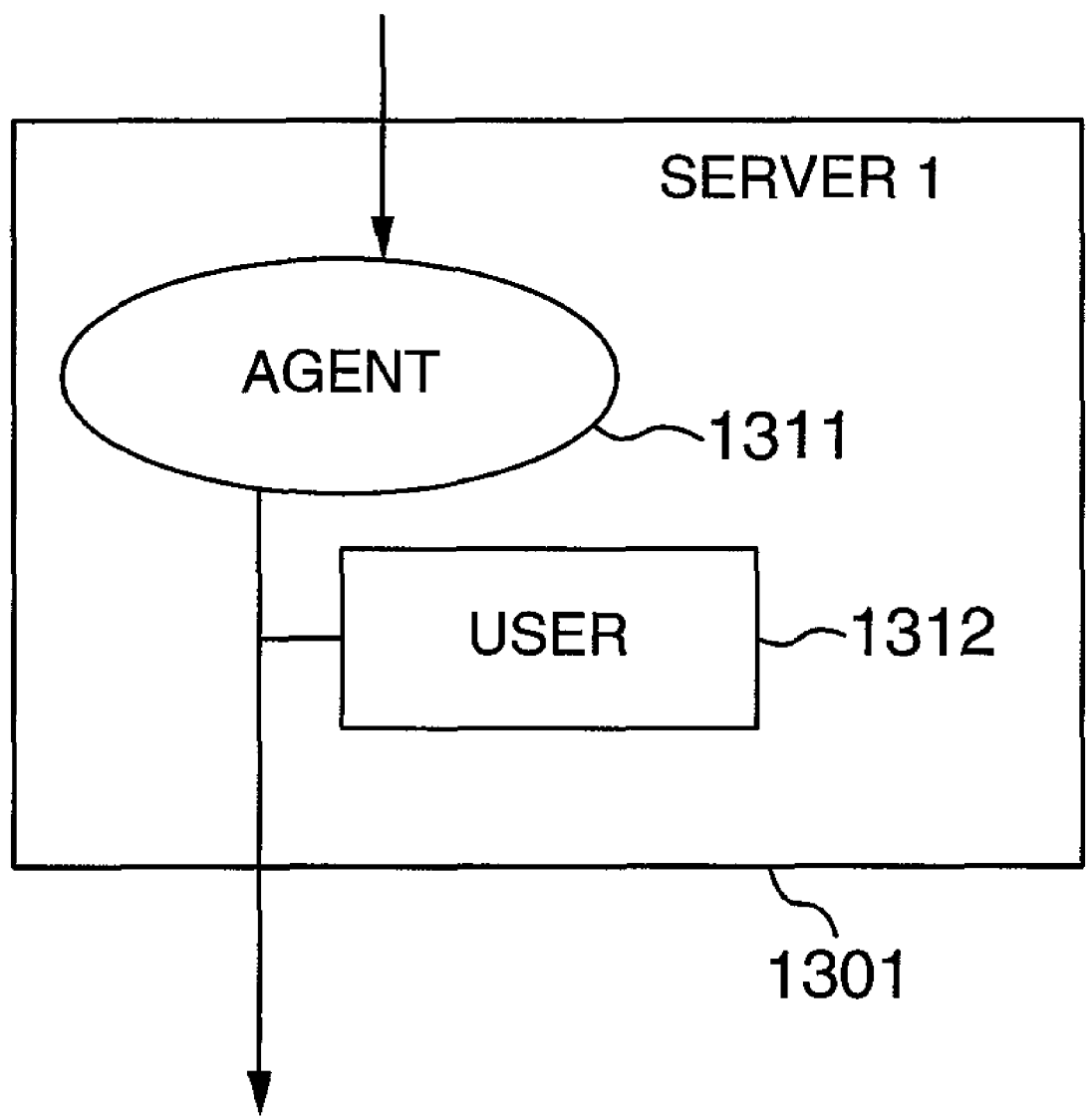
FIG. 13 is a function block diagram showing details of mechanisms included in each server.

FIG. 13 shows details of mechanisms existing in each of the servers 203 and 204. An agent 1311 functions to collect hardware information and software information concerning computer resources and send them to the policy server 202. At this time, a user 312 on a server 1301 inputs a schedule, load prediction, fault prediction and maintenance information of the server 1301, and transfers them to the policy server 202.

Figure 14:
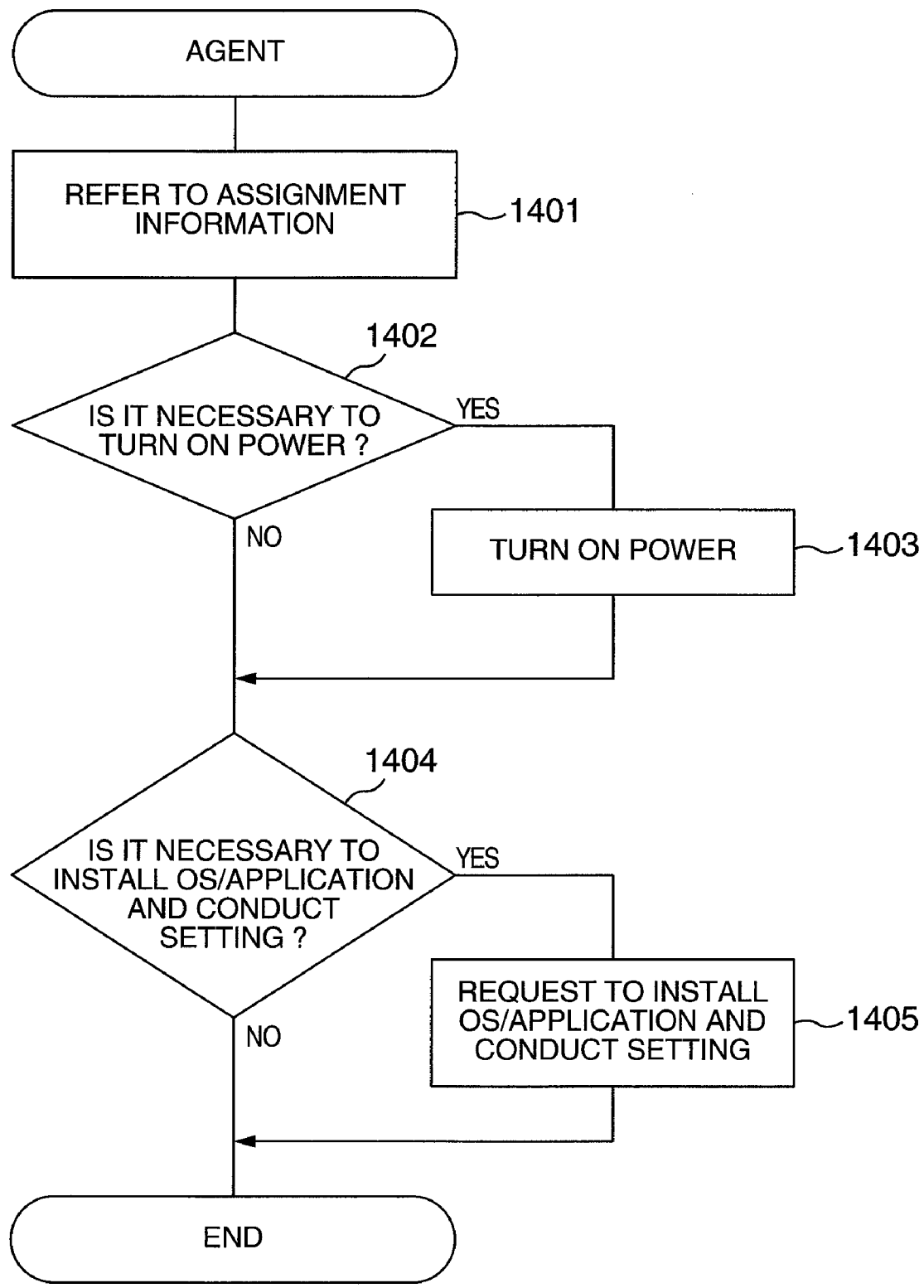
FIG. 14 is a flow chart showing a processing flow in an agent.

FIG. 14 shows a processing flow in the agent 1311 (211, 212). At step 1401, contents of the distribution resource determination (FIG. 10) issued by the resource assignment mechanism 514 are referred to. At step 1402, it is determined whether it is necessary to turn on power. If necessary, power is turned on at step 1403. At step 1404, it is determined whether it is necessary to install an OS and an application and conduct setting required for execution. If necessary, it is executed to install the OS and application and conduct setting required for execution at step 1405.

The operation method according to the present invention does not depend upon the architecture of hardware. In the same way, the operation method according to the present invention does not depend upon the OS.

Second Embodiment

Hereafter, a second embodiment of the computer resource distribution method based on the prediction technique will be described with reference to the drawings. In the second embodiment, a mechanism described in the first embodiment is used. In particular, a prediction portion concerning the load in the prediction mechanism shown in FIG. 6 will be described in detail.

Figure 15:
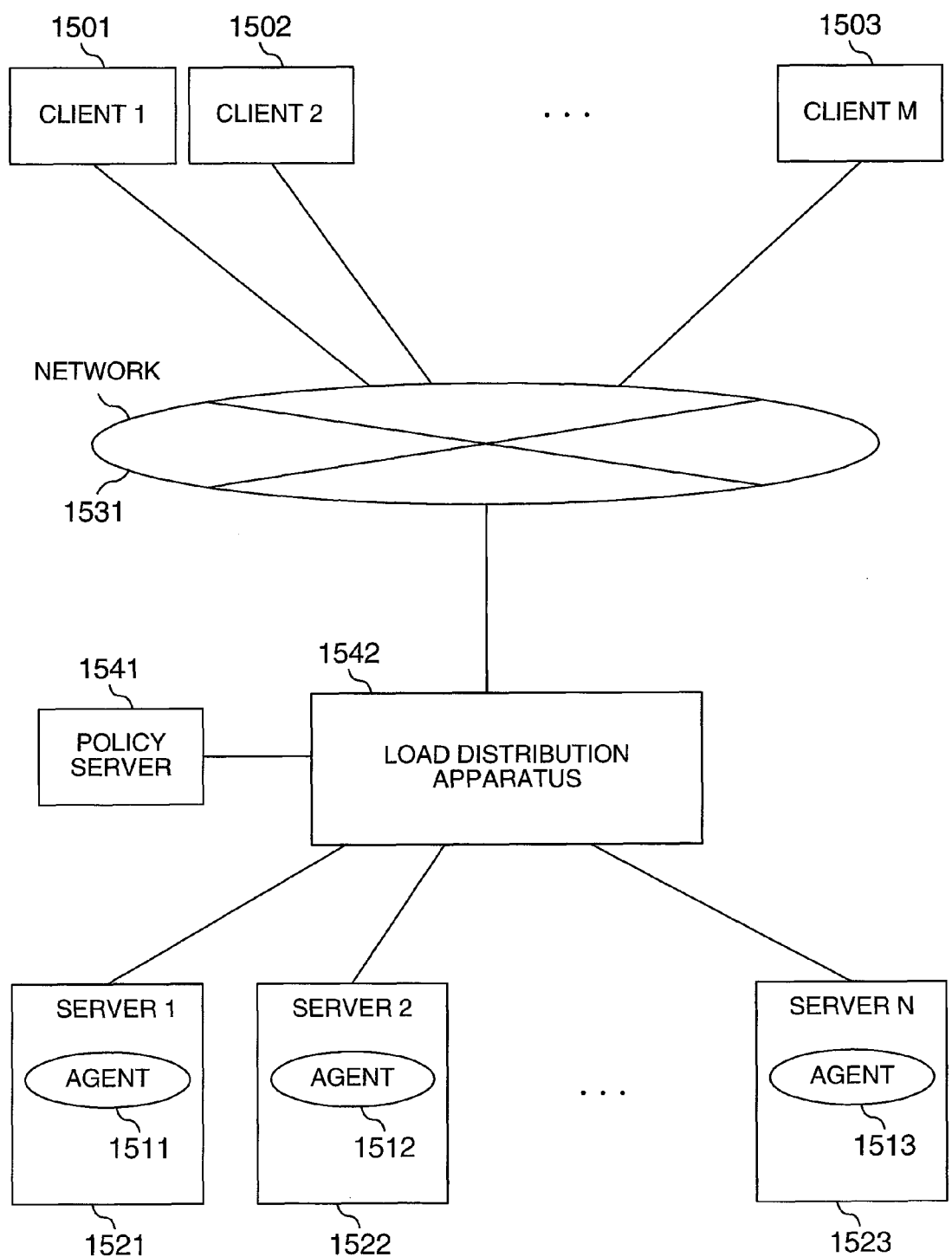
FIG. 15 is a block diagram showing a general configuration diagram in a second embodiment according to the present invention.

FIG. 15 shows how a plurality of clients 1501, 1502 and 1503 are connected to a plurality of servers 1521, 1522 and 1523 respectively having agents 1511, 1512 and 1513 via a load distribution apparatus 1542 and a network according to the computer resource distribution method based on prediction according to the present invention. A policy server 1541 is connected to the load distribution apparatus 1542.

FIG. 6 shows how servers 1621, 1622 and 1623 are clustered by at least one clustering software program 1643 instead of the load distribution apparatus 1542. As for the mechanism for thus distributing the load, various forms are conceivable. It is important that there is a mechanism capable of coping with a processing request issued by a client 1501, 1502, 1503, 1601, 1602 or 1603 by increasing computer resources such as servers or storages while taking a server, a CPU or a memory as the unit. The unit of increase may be a small number of servers, CPUs or memories. Therefore, each computer may be either of a physical computer and a logical computer. In the case of a Web server or an AP server, a requested increase of the processing quantity can be coped with by conducting addition while taking a server as the unit. In the case of a DB server, a requested increase of the processing quantity can be coped with by increasing the CPUs or memories.

Figure 16:
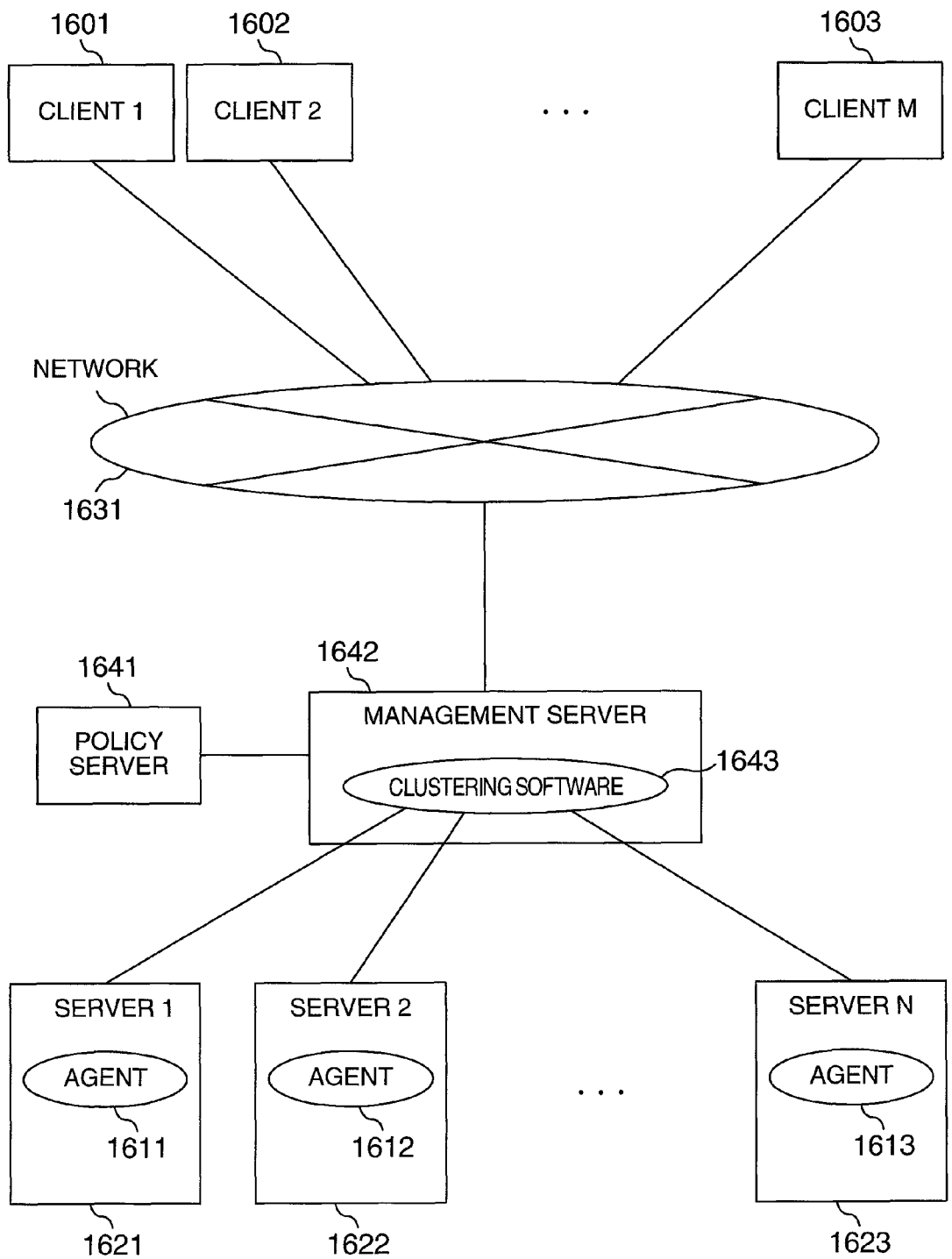
FIG. 16 is a block diagram showing a general configuration diagram in a variant of a second embodiment according to the present invention.
Figure 17:
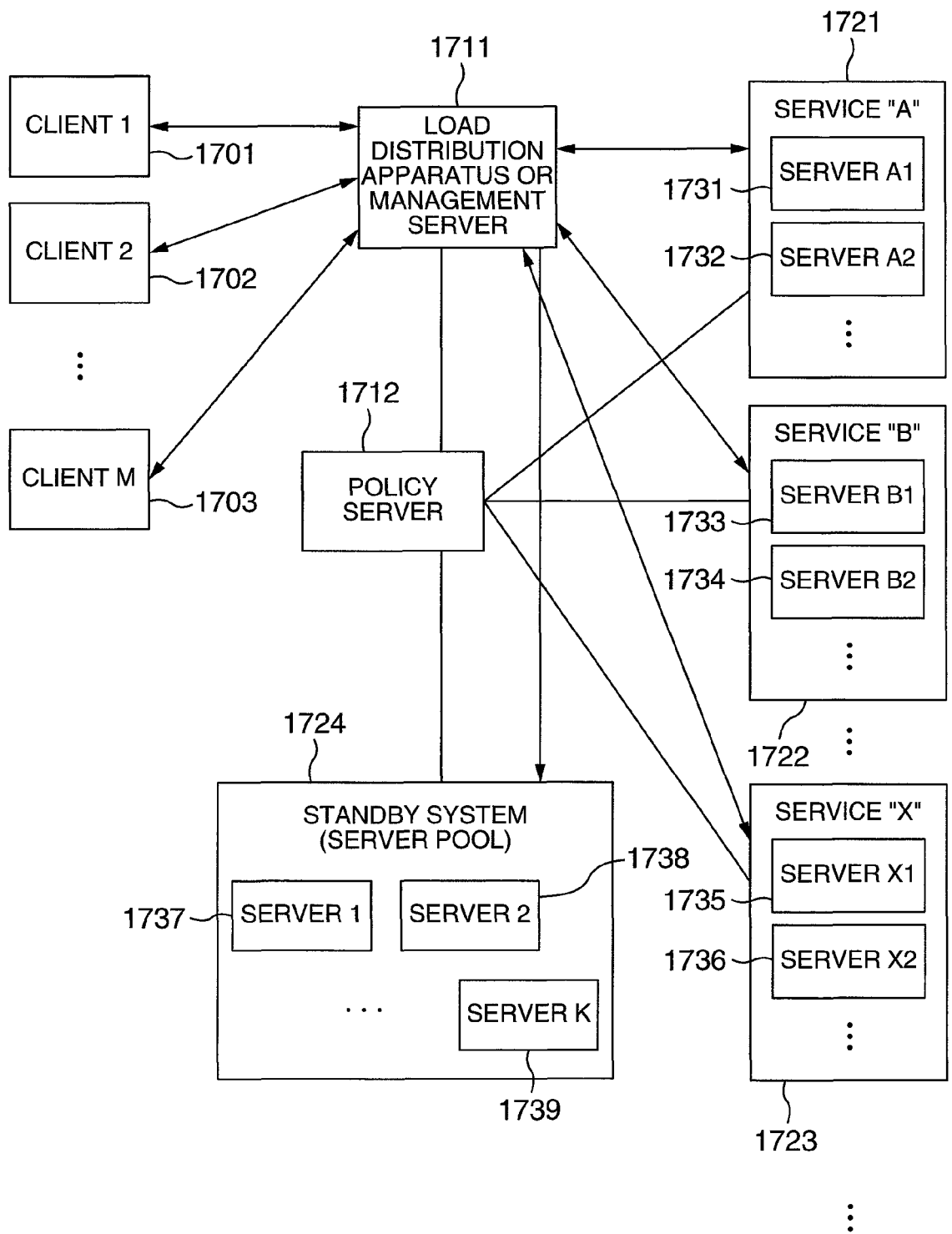
FIG. 17 is a block diagram showing a logical configuration of a second embodiment according to the present invention.

FIG. 17 shows how servers are configured logically for the physical configurations of the systems shown in FIGS. 15 and 16. Specifically, servers 1731 to 1739 are assigned to services 1721, 1722, 1723 and 1724. In service "A" 1721, service "B" 1722, and service "X" 1723, each of servers is in the active state for serving as the active system or the hot standby or cold standby state for serving as the standby system. In a standby system (server pool) 1724, each of servers is in the hot standby, cold standby or dead standby state for serving as the standby system. Here, prediction is executed irrespective of whether the service or server that becomes the subject of prediction is the active system or standby system. In the standby system, however, processing concerning business is not conducted, and consequently data for prediction cannot be acquired in many cases. As for the load prediction, therefore, the active system mainly becomes the subject of prediction. In the case of fault prediction, however, it is necessary to acquire data for the standby system as well. As for the priority concerning the lending of a server, basically a server in the standby system is higher than a server in the active system. What manages which server belongs to which service is a load distribution apparatus (or management server) 1711. What conducts determination is a policy server 1712. When lending a server between services, the server is certainly pooled in the standby system (server pool) 1724 once. A necessary OS and a necessary application are installed and various kinds of setting are conducted on the server pooled in the standby system (server pool) 1724. By doing so, not only the security between the services is maintained, but also it is possible to provide a business model that makes possible on-demand resource use in which servers included in the standby system (server pool) 1724 are not counted as the hardware use quantity and the software use quantity. As regards the hardware use quantity, there are many business models based on the CPU utilization factor. However, the very present invention method of recording the use quantity in each service can provide a flexible on-demand form for a plurality of services or users. Furthermore, the present scheme specifically indicates an on-demand software license providing scheme. Requests issued by the clients 1701, 1702 and 1703 are accepted by the load distribution apparatus (or management server) 1711, and distributed to respective services. At this time, the clients 1701, 1702 and 1703 cannot know how many servers are present in each service. A plurality of load distribution apparatuses (or management servers) 1711 may be present.

Figure 18:
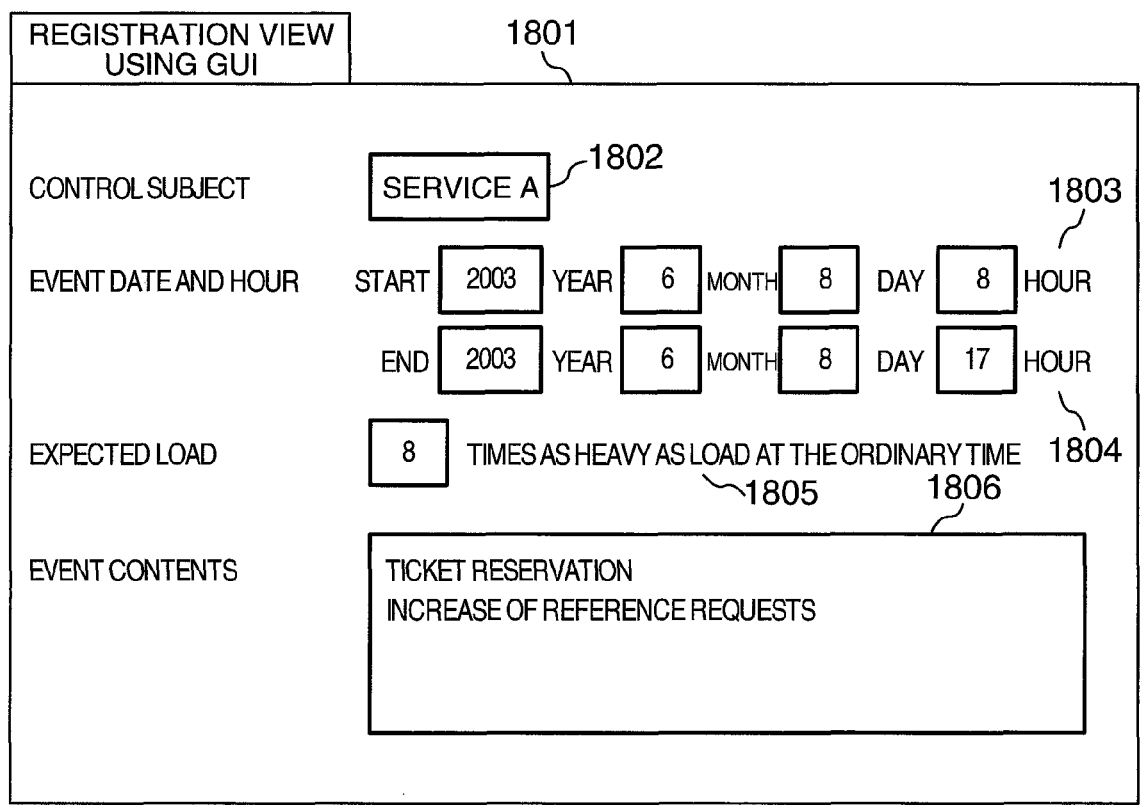
FIG. 18 is a diagram showing a registration view using a GUI.

FIG. 18 shows details of a registration view using the GUI for inputting information to the prediction mechanism 511. A registration view 1801 includes a portion 1802 for inputting a control subject, a portion 1803 for inputting an event start date and hour, a portion 1804 for inputting an event end date and hour, a portion 1805 for inputting an expected load, and a portion 1806 for inputting event contents. Each item is input by the administrator. In the portion 1802 for inputting a control subject, a service expected to change in load is specified. In the portion 1803 for inputting an event start date and hour, date and hour when a load change is expected to occur are specified, and the date and hour when the load change starts are specified. As for the portion concerning the specification of the date and hour, detailed setting of minute, second or the like may also be conducted. By conducting more detailed setting, it is possible to cope with a user's request finely. Furthermore, when selecting a service that can lend a resource on the basis of prediction, it becomes possible to select a subject of lending that meets the object closely. The portion 1805 for inputting an expected load is a portion for inputting how many times is supposed in load as compared with the past operation history. By a value entered in the portion 1805 for inputting an expected load, the quantity of resources to be lent is determined. For example, if a load that is eight times is expected, resources that are eight times as many as the ordinary load calculated by using an average value based on the past history are judged to be necessary and a request for lending resources that are eight times as many as the ordinary load is issued. In the portion 1806 for inputting event contents, a factor of the load change is entered. This information not only functions as a memorandum for the administrator, but also provides simplicity. That is, sorting is conducted by using the present information, and the administrator conducts input by referring to past actual operation results. Predetermined values are given for respective input items in some cases. As a result, it is possible to reduce the labor of the administrator. Furthermore, by leaving past input information as history, it is facilitated to refer to the past actual operation results and identify a service that needs resource reinforcement. Furthermore, by analyzing this information in the policy engine 512, further sophisticated autonomous control can be conducted and the labor of the administrator can be reduced.

Figure 19:
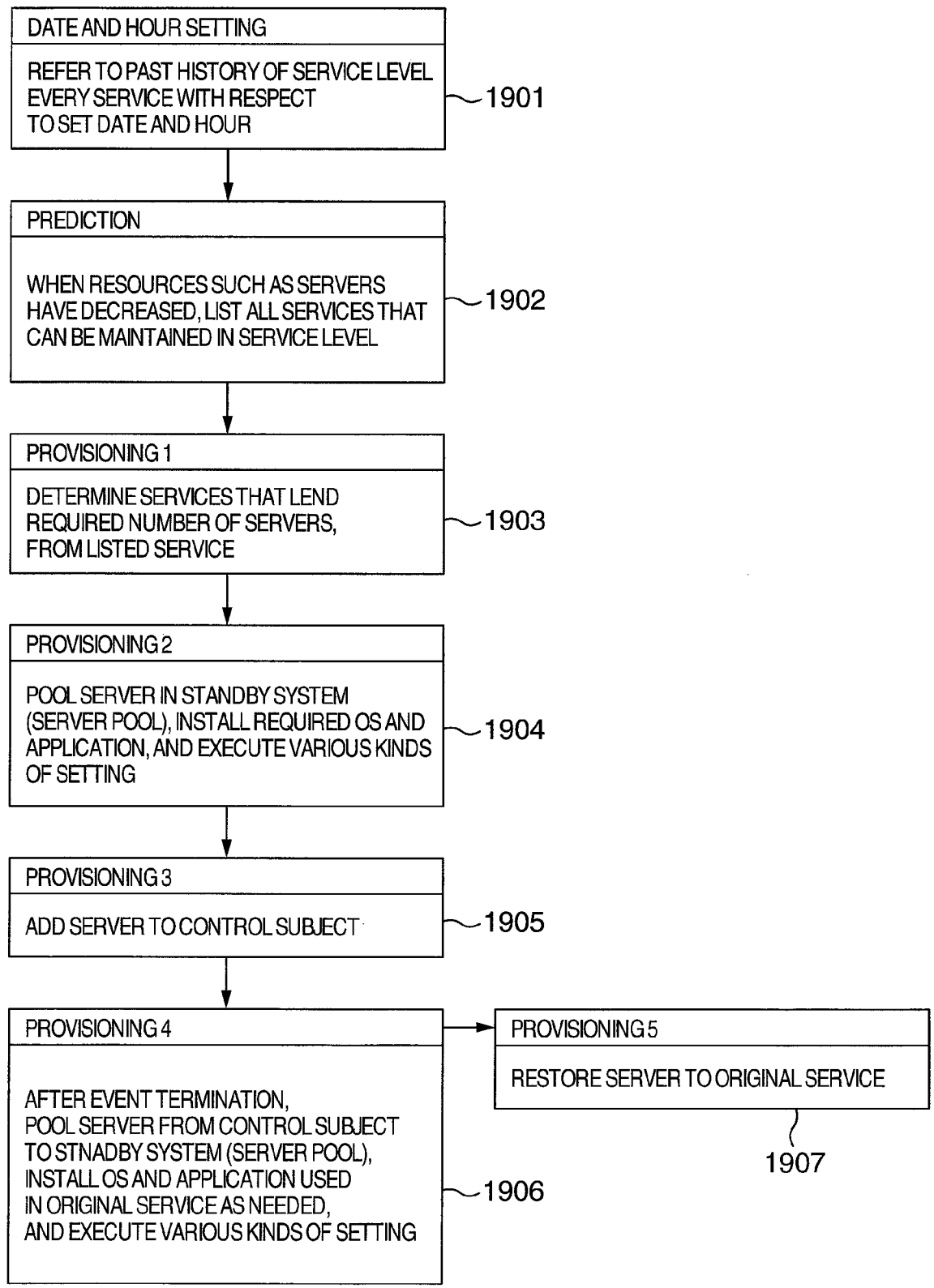
FIG. 19 is a flow chart showing a processing flow concerning load prediction and provisioning.

FIG. 19 shows a processing process in the policy server 501 shown in FIG. 5. A detailed processing mechanism will be described in detail with reference to FIG. 21. At step 1901, service level history for each service at the set date and hour entered in the registration view 1801 is referred to. At this time, the service level means, in some cases, parameters such as the response time and the number of processed requests that must be satisfied as regards the request (demand) of the user. In other cases, the service level means parameters such as the CPU utilization factor and the number of servers that must be satisfied as regards the supply. In some cases, both of them are mixedly present. This is prescribed by a contract made between a service provider and a service user and called service level agreement (SLA). It is typical that there is a plurality of service levels. For operating the prediction mechanism 511 autonomously, the priority of the service level should be prescribed and it should be retained in the policy DB 513. As for the "service user and the service provider," "the contents user and the contents provider" or "the computer resource user and the computer resource provider" are conceivable. Typically, the contents provider is the same as the computer resource user. In the case where a computer resource such as a server is lent, i.e., resources used in a certain service have decreased. All services that can be maintained in service level are listed at step 1902. At step 1903, a service and a server from which resources needed by the service specified in the portion 1802 for inputting the control subject, among services listed at the step 1902 are lent are determined. In the policy DB 513 or in the registration view 1801, the priority may be preset or the administrator may specify the priority. Unless specified or if the priority is the same, the service and server are determined in the order of reference. At step 1904, a server determined to be lent is pooled in the standby system (server pool) and a necessary OS and a necessary application are installed and various kinds of setting are executed. At step 1905, the server finished in various kinds of setting at the step 1904 is added to the service of the control subject, and business is started. After the event specified in the registration view 1801 is finished, the policy server pools the server from the control subject to the standby system (server pool) again, installs the OS and application used in the original service as needed, and executes various kinds of setting at step 1906. It is now supposed that the service in which the lent server was originally used, and the OS, the application and various kinds of setting that were used in the original service are stored in a place where the policy server 501 can refer to. This prevents the service level in the service that lent from being hampered before and after the lending. Owing to the way of use in which the server is used preferentially without restoring the server to the original service if there is an event subsequently set, the time required to install and set the kinds of information can be reduced. The priority change can be reflected by updating the policy DB 513.

At step 1907, the server is restored to the original service. The information described in the resource management table 515 is used in server scheduling concerning server lending in some cases. Even in the case where events in a plurality of control subjects occur overlapping each other in time, therefore, it becomes possible to lend a server without restoring it to the service once. This prevents time from being used for useless installing and setting wastefully.

Figure 20A:
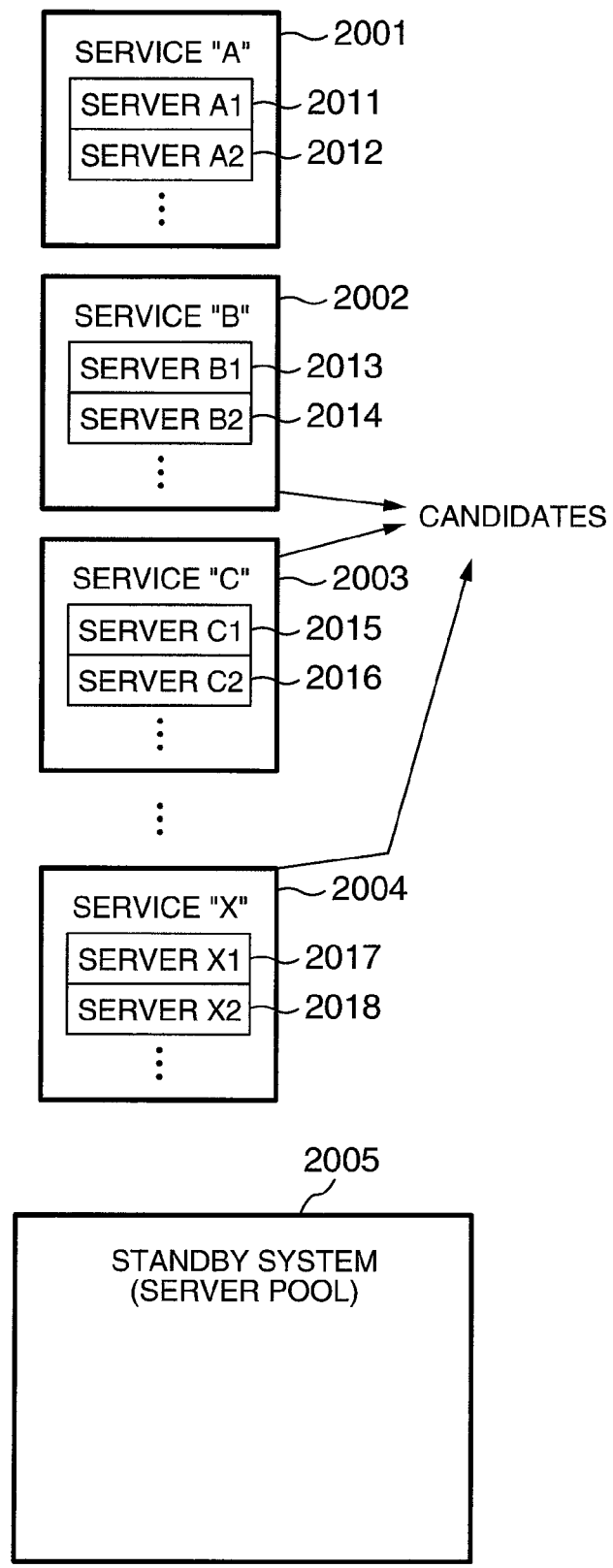
FIG. 20A is a conceptual diagram showing a state in which servers to be lent are extracted after load prediction.
Figure 20B:
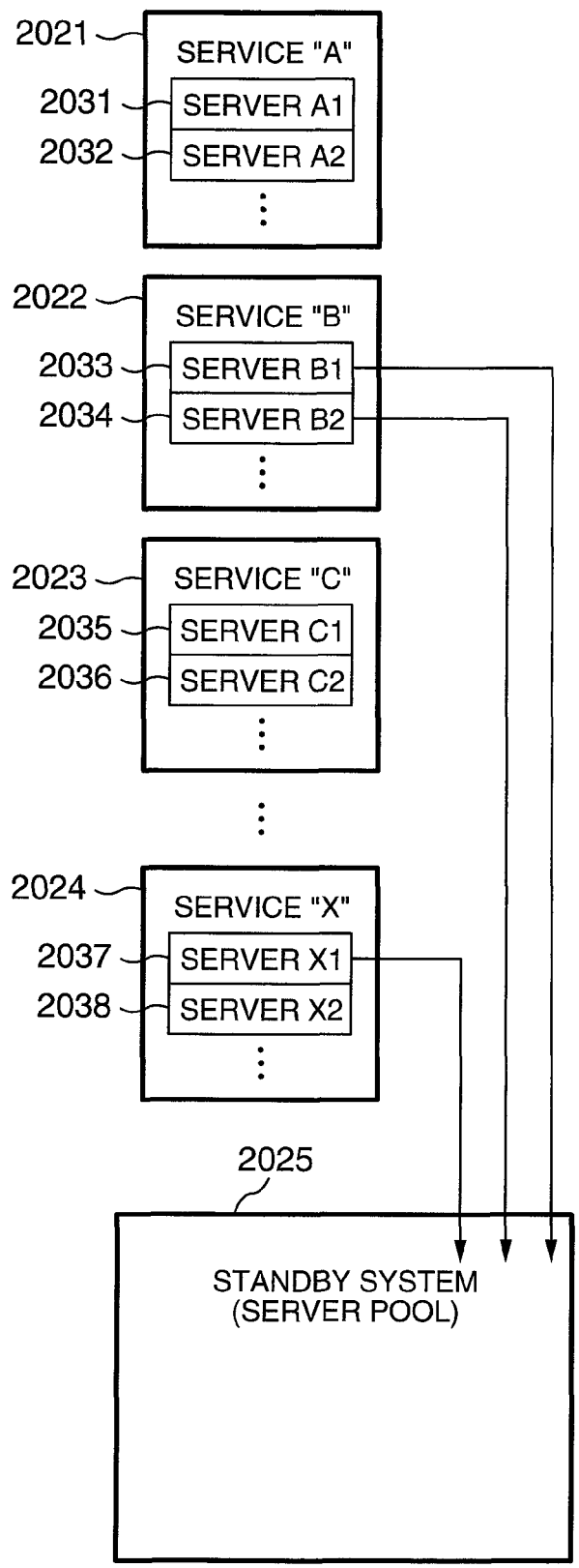
FIG. 20B is a conceptual diagram showing a state in which servers to be lent are pooled in a standby system (server pool)
Figure 20C:
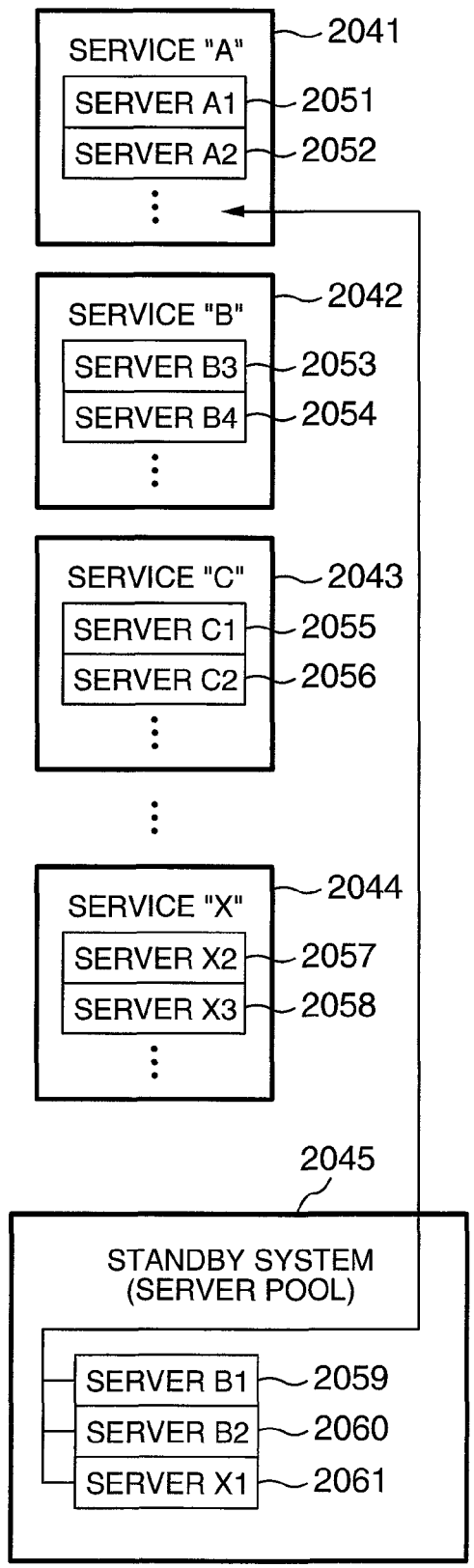
FIG. 20C is a conceptual diagram showing a state in which a standby system (server pool) lends servers to control-specified service after a necessary OS and applications are installed in the servers and various kinds of setting are finished.

FIGS. 20A to 20E illustrate the processing process in the policy server 501 shown in FIG. 19. Especially, FIGS. 20A and 20B illustrate server movement (logical server movement) between services called provisioning in detail. FIG. 20A shows a stage at which information concerning server candidates that can be lent from respective services in the order indicated by the steps 1901, 1902 and 1903 in FIG. 19 has been obtained. FIG. 20B shows how servers determined to be lent as indicated at the step 1904 are pooled into a standby system (server pool) 2025. At this time, the servers may be pooled into the standby system (server pool) at a time. By pooling part by part in stages with predetermined time spent, however, the total number of servers in the operation state can be increased or decreased in stages. Even if an unexpected load occurs in the service of lending source, therefore, the number of servers lent can be adjusted. Furthermore, by gradually decreasing the total number of servers in the operation state, it becomes possible for a service provider such as a data center to attempt to stabilize the whole system. For that purpose as well, a mechanism for sampling the current load every service or every server is important. It takes several tens minutes to several hours to lend a resource such as a server, because the time required for installing and various kinds of setting is dominant. The sampling interval is typically on the order shorter than that, and it is in the range of several seconds to several minutes. FIG. 20C shows how servers 2059, 2060 and 2061 with the necessary OS and application installed therein and various kinds of setting finished in a standby system (server pool) 2045 as indicated by the step 1905 are added to service "A" 2041, which is a control subject service.

Figure 20D:
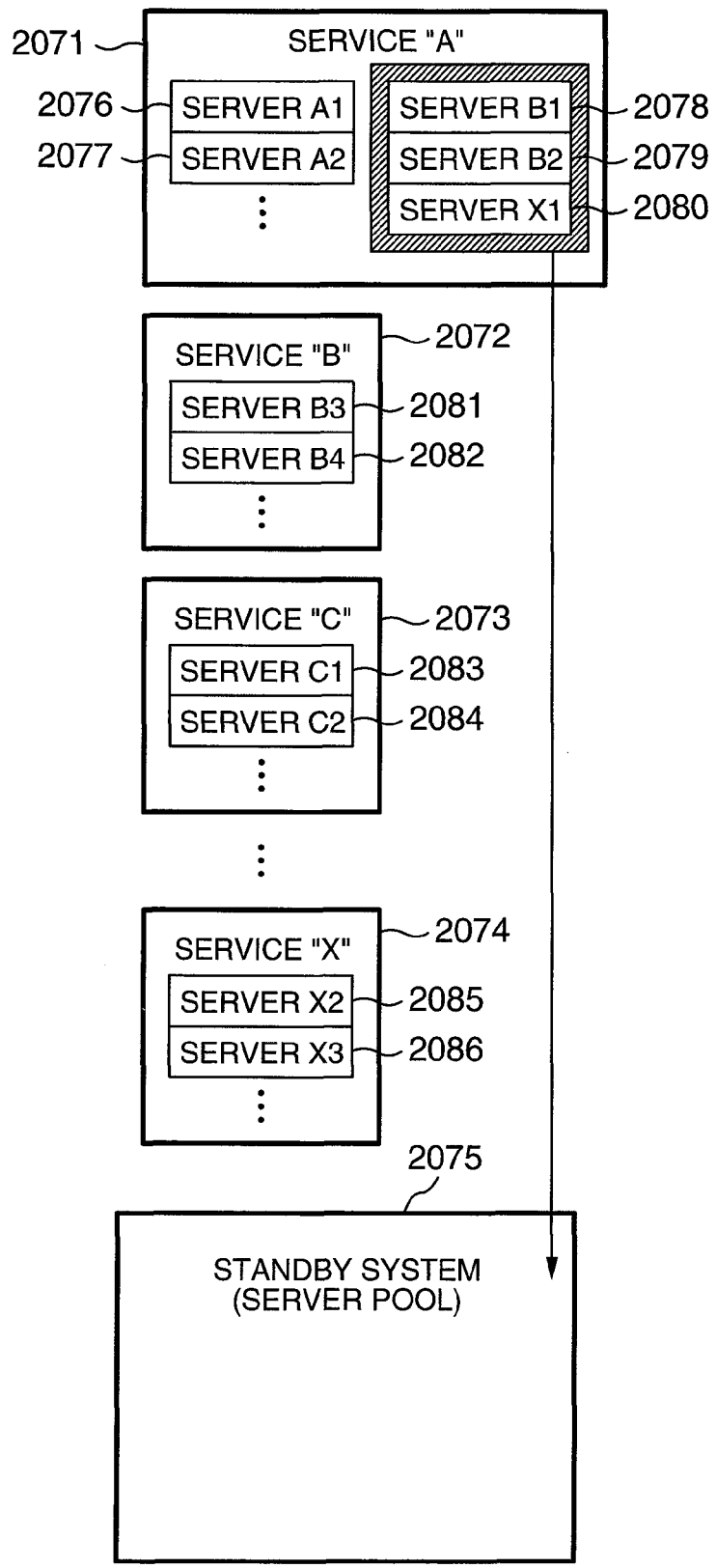
FIG. 20D is a conceptual diagram showing a state in which lent servers are pooled in a standby system (server pool)
Figure 20E:
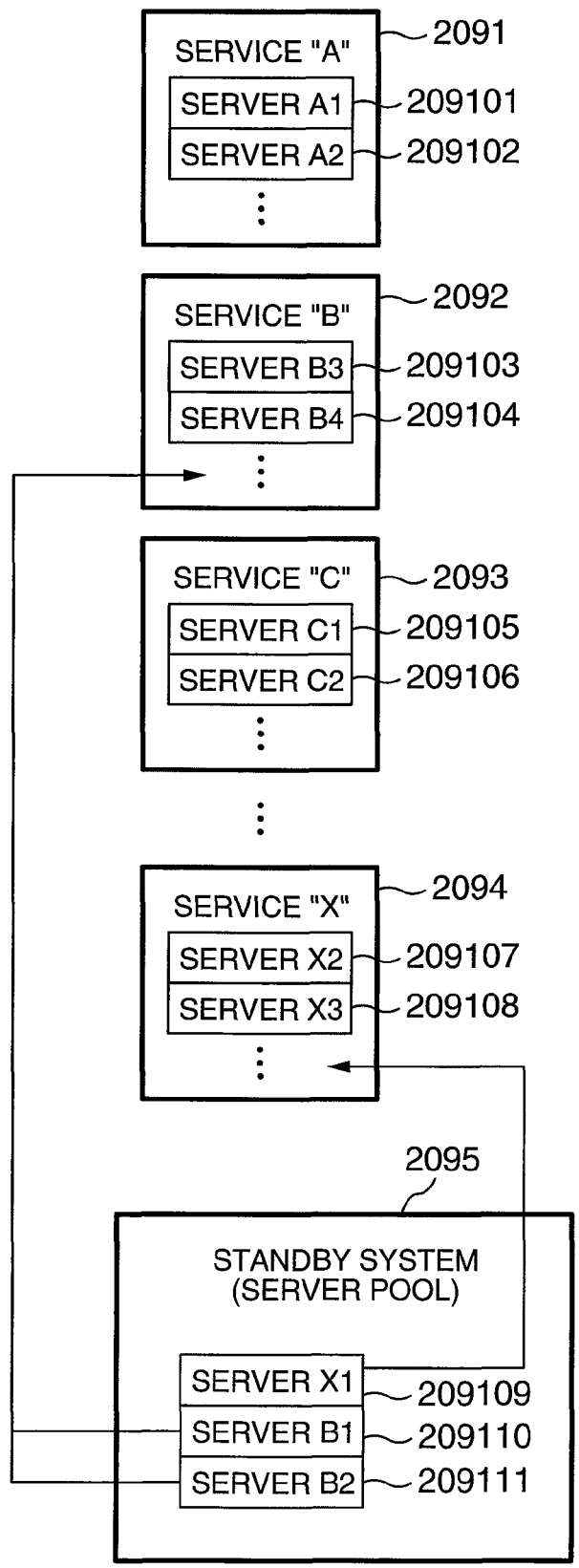
FIG. 20E is a conceptual diagram showing a state in which lent servers are returned to original service.

FIG. 20D shows how after event termination the policy server pools servers from service "A" 2071, which is control subject service, into a standby system (server pool) 2075, installs the original OS and application, and executes various kinds of setting, when restoring the servers to the service of lending source as indicated by the step 1906. At this time as well, the servers may be reduced at a time as described in detail with reference to FIG. 20B. By making a schedule so as to decrease the servers in stages with a predetermined time spent, however, it becomes possible to cope with the case where a high load continues even after the event is terminated. It is desirable that the sampling interval for each service or each server is shorter than time required for installing and various kinds of setting (in the range of several tens minutes to several hours) in the same way and is in the range of several seconds to several minutes. FIG. 20E shows how servers are restored to the original service as indicated by the 1907. The above-described time required for installing and various kinds of setting is obtained supposing that the installing and setting are conducted anew. In some cases, however, the OS and application or only the application is installed and setting is conducted. This control is conducted by the policy engine 512. At this time, the time taken until the servers are caused to start the business becomes shorter. Therefore, it is necessary to set the sampling time to a smaller value.

Figure 21:
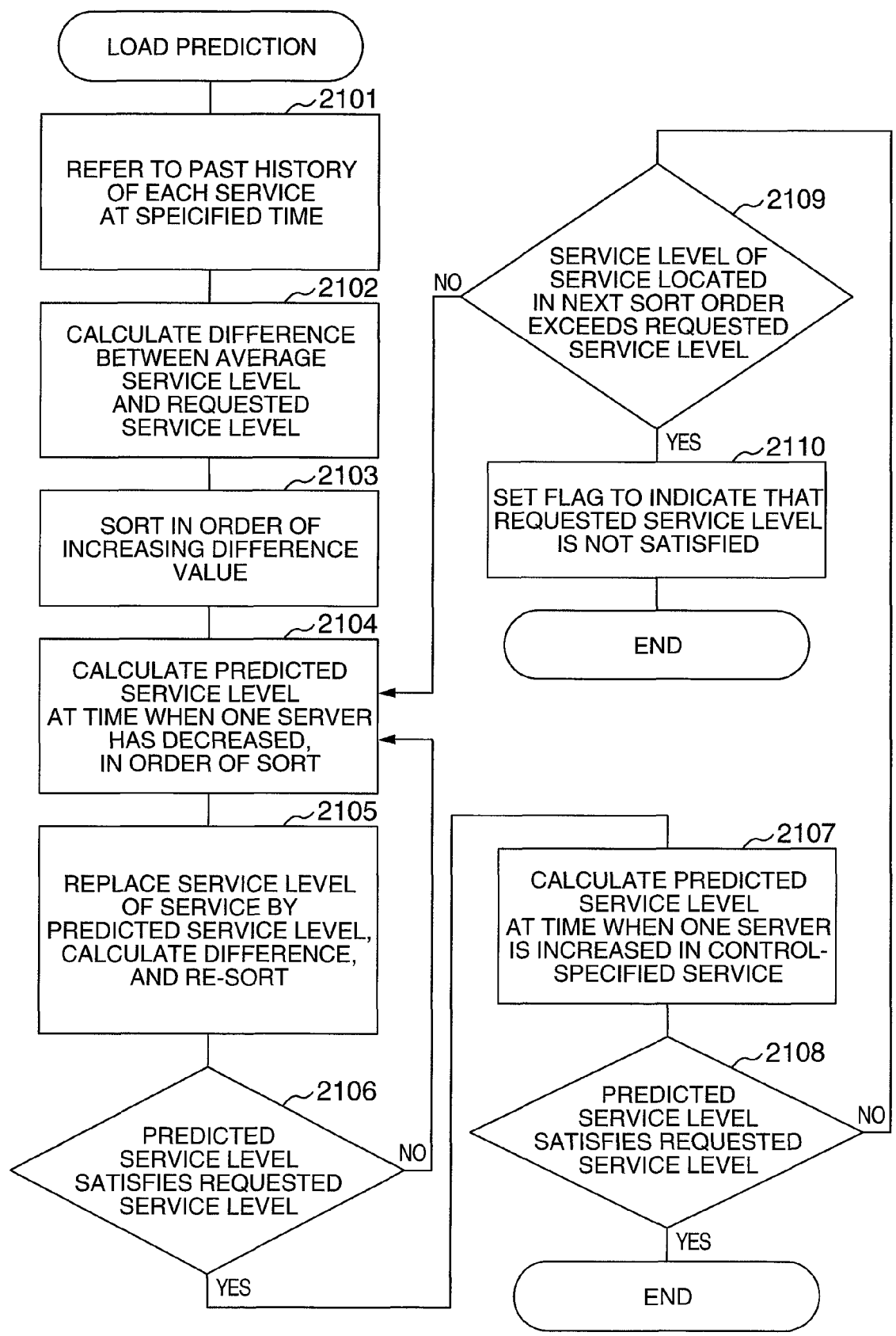
FIG. 21 is a flow chart showing a processing flow concerning load prediction.

FIG. 21 shows a processing flow with respect to each step concerning the load prediction and the provisioning shown in FIG. 19. At step 2101, past history of respective services at time specified in the registration view 1701 is referred to. At this time, the time average in the specified time is used. In order to conduct precision with higher precision, however, prediction may be conducted by using a sampling time shorter than the specified time interval or its multiple (including an integer times or a decimal fraction times). At step 2102, a difference between the average service level calculated at the step 2101 and a requested service level is calculated. Hereafter, the subject of evaluation becomes the difference. If the priority is specified, however, evaluation is conducted by using the product of the difference and the priority and using a model expression. Since the case where the requested service level is different is supposed, the difference is evaluated. In the case where the requested service level is the same, however, the average service level is directly evaluated in some cases. It is necessary to incorporate a parameter to be evaluated and how to evaluate in the policy engine 512, or conduct implementation so that specification may be conducted from the policy DB 513 or the user. Furthermore, by using a mechanism for detecting the periodicity of the load and incorporating it into the priority, it is possible to improve the precision of the prediction. By improving the precision of the prediction, it is possible to facilitate narrowing down services serving as the lending source. There is also the effect of preventing an erroneous decision. As a mechanism for detecting the periodicity, a method of registering previously known information of (such as the daytime, the weekend, and the end of the month) high load or low load, and a method of conducting calculation from the tendency on the basis of a mathematical model while allowing a dispersion of some degree are conceivable. Owing to such implementation, not only flexible control for each user or service becomes possible, but also a merit of preventing an erroneous decision and broadening the width of selection for the administrator is obtained. At step 2103, sorting is conducted in the order of increasing difference value on the basis of the difference calculated at the step 2102. At step 2104, a predicted service level at the time when the number of servers has decreased by one is calculated for each of the services sorted at the step 2103 in order. At step 2105, the current service level is replaced by the predicted service level and it is retained. At step 2106, it is determined whether the predicted service level satisfies the requested service level. If the predicted service level does not satisfy the requested service level, the processing returns to the step 2104 and the predicted service level is calculated for the next service. If the predicted service level satisfies the requested service level, the processing proceeds to step 2107. At the step 2107, a predicted service level at the time when the number of servers has increased by one in the control-specified service is calculated. At step 2108, it is determined whether the predicted service level calculated at the step 2107 satisfies the requested service level. The requested service level in this case refers to the service level specified for the expected load 1805 entered in the registration view 1801. In some cases, a model expression is incorporated in the policy DB 513, and the policy engine 512 uses the service level converted by using the model expression as the requested service level. As a result, it becomes possible to autonomously conduct work that has been conducted empirically by the administrator. If the predicted service level satisfies the requested service level, the processing proceeds to the end. If the predicted service level does not satisfy the requested service level, the processing proceeds to step 2109. At the step 2109, it is determined whether a service level of a service located in the next sort order satisfies the requested service level. If the requested service level is not satisfied, a mark is left. For example, a flag to that effect is set. And the processing proceeds to the end. If the requested service level is satisfied, the processing returns to the step 2104. In a situation where enough servers to satisfy the requested service level cannot be lent, the step 2109 prevents the loop ranging from the step 2104 to the step 2106 from being executed infinitely.

After all steps have been finished, the system proceeds to the provisioning. At that time, the administrator may be made to make a final decision. In other words, services capable of maintaining their service levels even if they are deprived of resources are listed. Subsequently, those services are displayed on the screen as candidates for resource deprivation, and the administrator is urged to input a final decision. The administrator determines whether resource deprivation may be conducted in each of the listed services, and inputs the decision as a final decision. Only resources permitted to be deprived of are pooled into the standby system at the stage of provisioning. Even if the precision of the prediction is low, it can be compensated with the capability and an empirical law by thus operating the system in an interactive way. Therefore, it is possible to provide a system that is very high in operation efficiency. Even if the precision of the prediction is high, it becomes possible to cope with it flexibly by entrusting the administrator with the final decision. Even in this case, the present invention scheme greatly reduces the labor of the administrator and prevents the loss of the business chance, and its effect and positioning do not change.

Figure 22A:
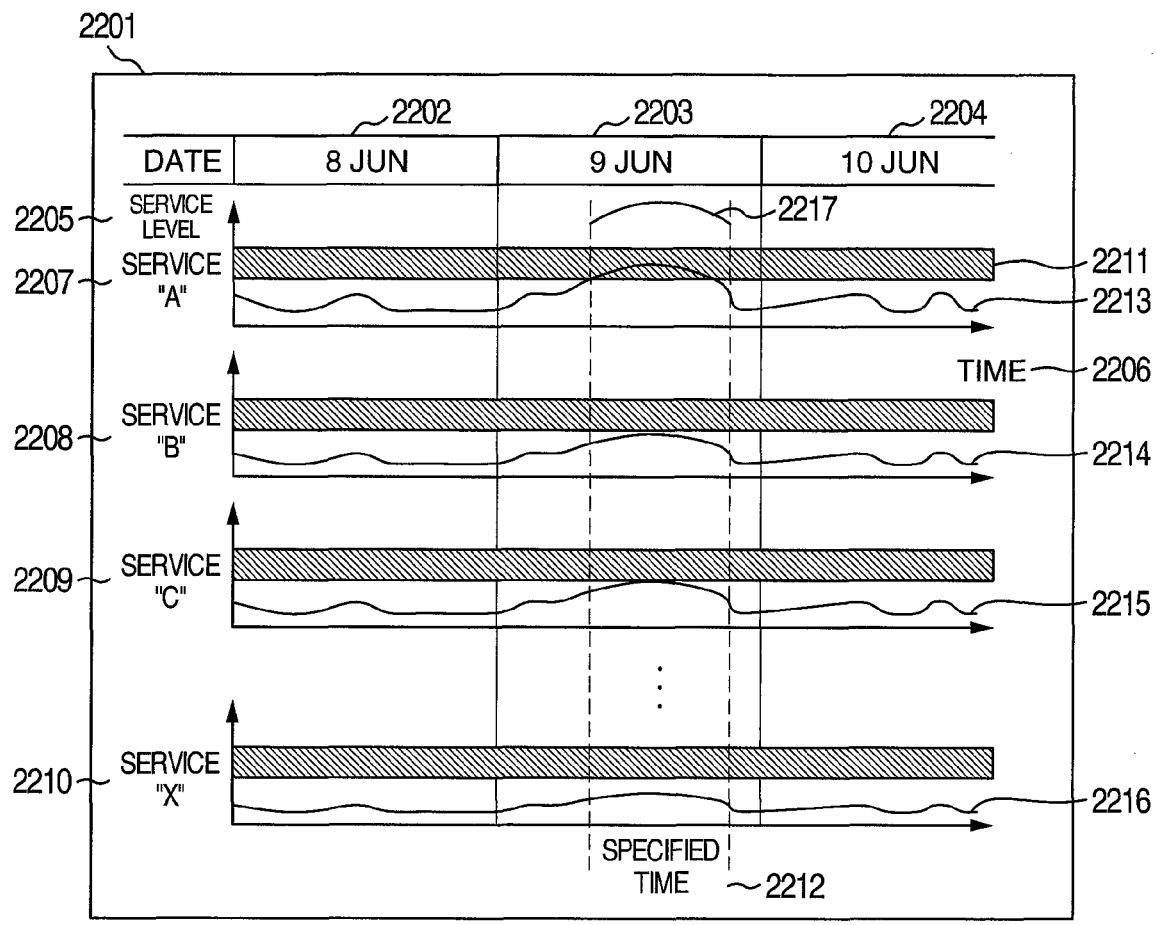
FIG. 22A is a diagram showing a GUI view that displays service level past history.
Figure 22B:
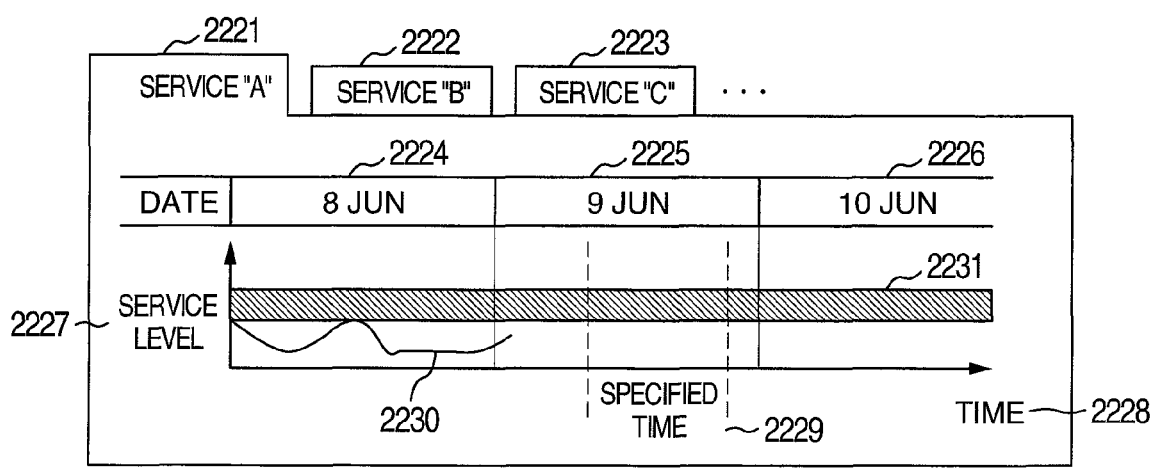
FIG. 22B is a diagram showing a GUI view that displays a time change of a service level in the case where the present invention is applied.
Figure 22C:
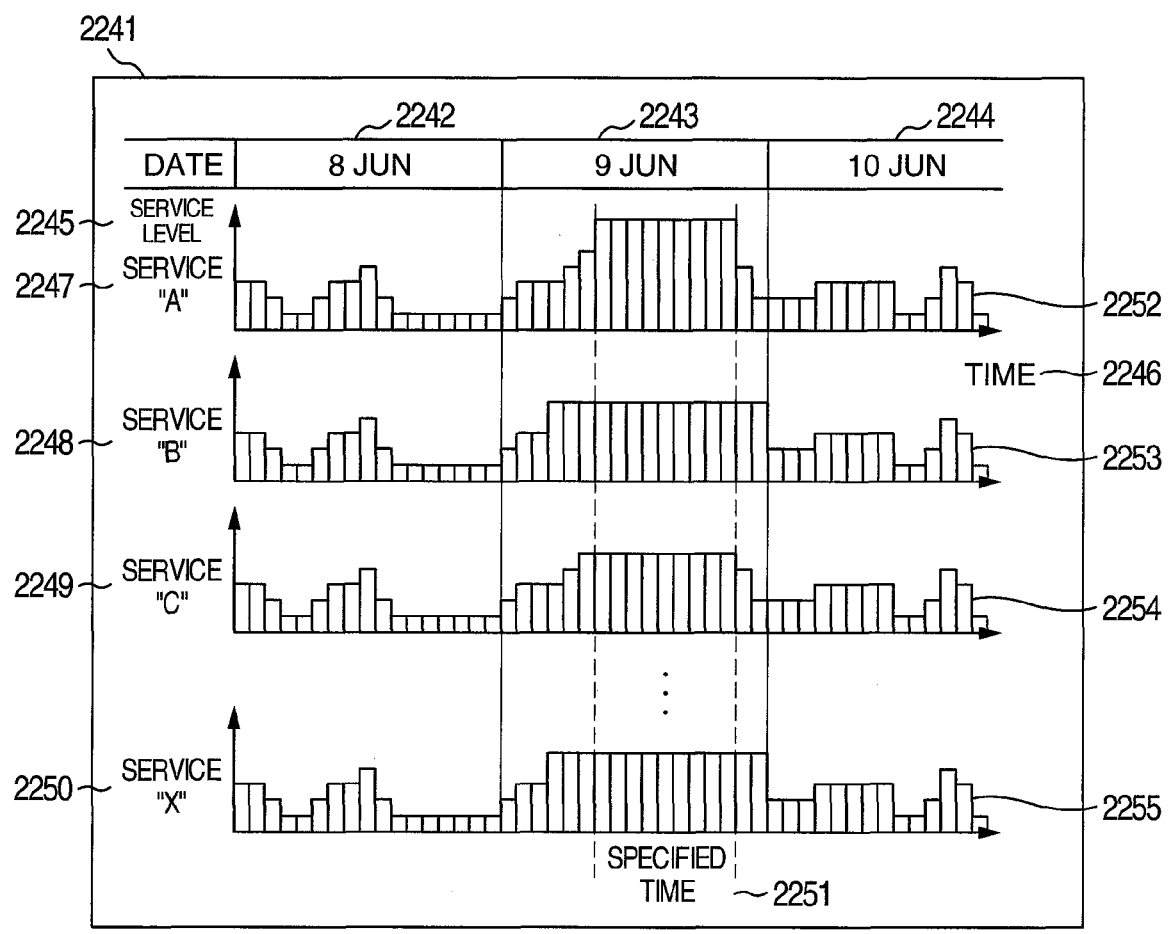
FIG. 22C is a diagram showing a GUI view that displays a time change of the number of servers in the case where the present invention is applied.

FIGS. 22A to 22C show a result obtained when operation is actually conducted by using the operation scheme according to the present invention. FIG. 22A shows changes of service levels 2205 with time 2206. Information entered in the registration view 1801 is reflected. Service names 2207, 2208, 2209 and 2210, specified time 2212, requested service level 2211, and dates 2202, 2203 and 2204 are displayed. Furthermore, past histories 2213, 2214, 2215 and 2216 are displayed. By reflecting the value entered in the expected load 1805 in the registration view 1801, or a value processed in the policy DB 513 or the policy engine 512, an expected service level 2217 is displayed. In FIG. 22B, a sampling result of a service level in each of services 2221, 2222 and 2223 is displayed. In the view configuration, there are dates 2224, 2225 and 2226, service level 2227, time 2228, specified time 2229, history 2230, and requested service level 2231. If the services 2221, 2222 and 2223 can be switched by using a tab, administration conducted by the administrator is facilitated. In FIG. 22C, sampling results of the service levels are displayed. In this case, the service level is supposed to be the number of servers. In the view configuration, dates 2242, 2243 and 2244, service names 2247, 2248 and 2249, service level 2245 (the number of servers), time 2246, specified time 2251, and histories 2252, 2253 and 2254 of service levels with time are included. FIG. 22A shows the past history, and FIGS. 22B and 22C show the current sampling result and the result of lending. According to FIG. 22C, the service "B" 2248 and the service "X" 2250 become the lending source of servers, and lend servers to the service "A." As shown in FIG. 22B, therefore, operation is conducted without the service level 2230 exceeding the requested service level 2231. At this time, the service level satisfies the requested service level in other services as well.

Figure 23A:
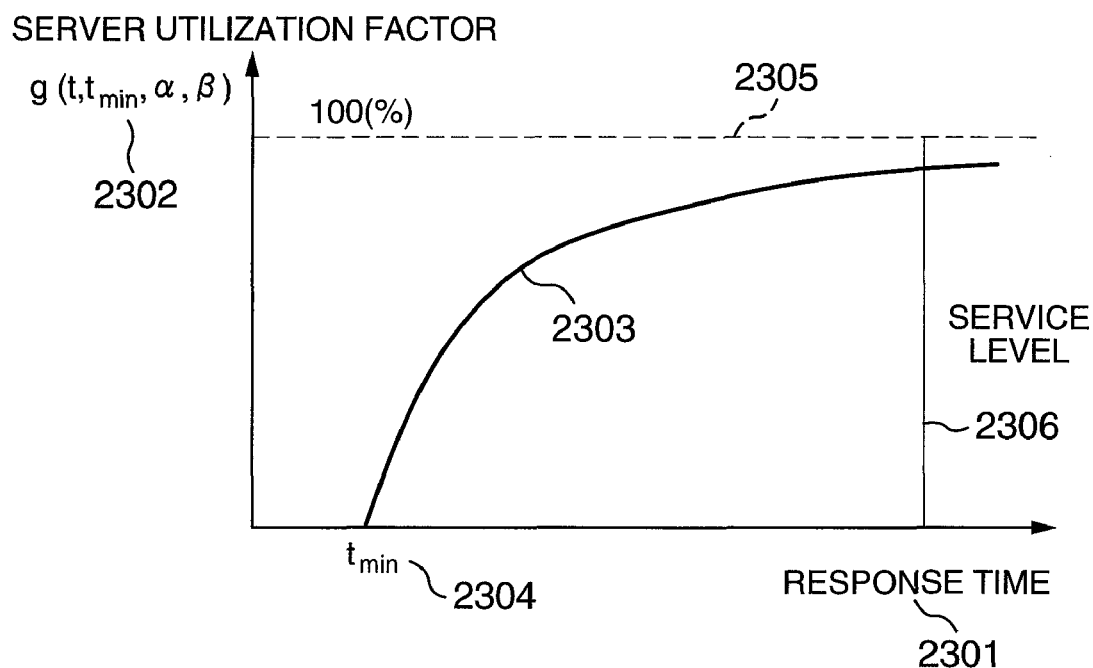
FIG. 23A is a characteristic diagram showing a relation between a response time and a server utilization factor used in a first prediction technique.
Figure 23B:
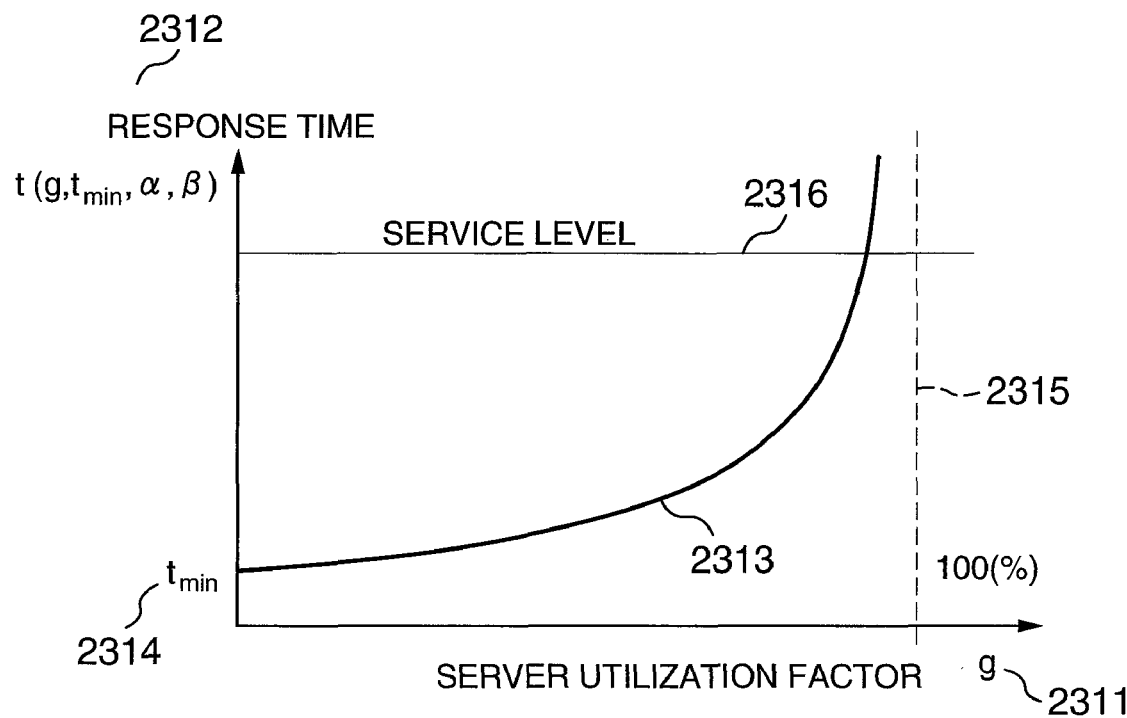
FIG. 23B is a characteristic diagram showing a relation between a server utilization factor and a response time used in a second prediction technique.

FIGS. 23A and 23B show details of the prediction technique. In a first technique, the required number of servers is calculated from response time 2301 and the number of servers. A relation 2303 between the response time 2301 and a server utilization factor 2302 illustrated in FIG. 23A is used. Parameters referred to at this time are the response time 2301 and the number of servers. By subtracting the calculated number of necessary servers from the number of currently assigned servers, the number of servers that can be lent is calculated. At this time, by preventing the given response time 2301 from exceeding the service level 2306, the number of servers that can be lent while maintaining the service level 2306 can be found. The following formulas are used in the first technique.

$$f(g, n) = g(t, t_{min}, \alpha, \beta) \times n \quad (1)$$
$$g(t, t_{min}, \alpha, \beta) = \frac{(t - t_{min})}{(t - t_{min}) + \alpha} \times \beta$$

Here, f(g, n) represents the number of necessary servers, g(t, tmin, α, β) the server utilization factor 2302, n the past history or current number of servers, t the response time 2301, tmin a minimum response time 2304, α a constant having a time dimension, and β a dimensionless constant. Typically, α and β have values that differ from service to service. In some cases, α and β have values that differ according to the load magnitude. At that time, α and β become variables having parameters concerning the load, hardware, OS and application.

In a second technique, a response time 2312 is calculated from a server utilization factor 2311 by using a relation 2313 illustrated in FIG. 23B. Here, it becomes important to set a server utilization factor so as not to exceed a service level 2316. Parameters referred to at this time are the server utilization factor 2311 (a CPU utilization factor of each service or server is used in some cases) and the number of servers. When the number of servers is reduced, the server utilization factor 2311 increases in inverse proportion to the ratio of decrease. It is necessary to prevent the response time 2312 from exceeding the service level 2316 due to the increase of the service utilization factor 2311, on the basis of the relation 2313 shown in FIG. 23B. As for the relation 2313 shown in FIG. 23B, a generally known queue is used in some cases. The following formulas are used in the second technique.

$$t(g, t_{min}, \alpha, \beta) = \frac{g}{\beta - g} \times \alpha + t_{min} \quad (2)$$
$$g = \frac{n}{n - m}$$

Here, t(g, tmin, α, β) represents the response time 2312, g the server utilization factor 2311, n the past history or current number of servers, m the number of servers to be lent, tmin a minimum response time 2314, α a constant having a time dimension, and β a dimensionless constant. Typically, α and β have values that differ from service to service. In some cases, α and β have values that differ according to the load magnitude. At that time, α and β become variables having parameters concerning the load, hardware, OS and application.

In the second embodiment, mainly the load prediction has been described in detail. As regards the fault prediction as well, it is possible to improve the precision, reduce the labor of the administrator, and implement the improvement in the use efficiency of computer resources owing to the autonomous operation of computers, by using a similar technique. The operation method according to the present invention does not depend upon the architecture of hardware. In the same way, the operation method according to the present invention does not depend upon the OS.

Heretofore, the resource distribution method using the prediction technique has been described. However, it is very important not to apply the prediction technique to only the service that wishes for resources, but to apply the prediction technique to all services including services that provide resources. As a result, it is possible to maintain the service level not only in services that issue resource requests but also in all other services. Furthermore, by providing resources from services having remaining power on the basis of the prediction technique, the service level can be maintained without newly adding resources, resulting in an effect of suppressing the increase of the initial cost caused by resource addition. As for the priority at the time when lending resources, resources should be lent to the standby system preferentially. However, the prediction technique is applied irrespective of the distinction between the active system and the standby system. In the case of the load prediction, it suffices to collect information from only the active system. In the case of fault prediction, however, information should be collected from both the active system and the standby system. This is caused by the fact that the prediction is based on the actual results of operation. In the case of the fault prediction, it is necessary to predict faults for the standby system as well on the basis of information obtained from the hardware and software.

The possibility that the present invention is used for system operation in computer resource providing facilities such as data centers and utility centers is high. It is expected that the present invention will contribute to the technique in that field.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer resource distribution method for a computer system in which a plurality of computer resources are assigned to a plurality of services and respective services are operated, said computer resource distribution method comprising the steps of, when a service level of a first service included in the plurality of services may not satisfy a requested service level:
obtaining a requested service level and a predicted service level of a second service which is different from the first service;
determining whether the predicted service level of the second service satisfies the requested service level when a portion of computer resource of the second service is assigned to the first service;
when the predicted service level of the second service satisfies the requested service level, determining whether the predicted service level of the first service satisfies the requested service level by assigning the portion of computer resource of the second service and determining the second service which can provide the portion of computer resource to the first service;
depriving the portion of computer resource from the determined second service; and
assigning the deprived portion of the computer resource to the first service,
wherein the determination whether the service level of the first service included in the plurality of services may not satisfy the requested service level is done by referring an information that provides an event of the first service, a standard value of the event and a schedule for taking action with respect to each event, and
when the predicted service level does not satisfy the requested service level as regards the standard value of the event, outputting a resource assignment request of the computer resources to the first service so as to execute the action along with the schedule for taking action with respect to each event.

2. A computer resource distribution method according to claim 1, further comprising the step of, when there are a plurality of second services:
determining whether there is a second service which can provide a portion of computer resource by determining whether the predicted service levels satisfy the requested service levels for the plurality of the second services.

3. A computer resource distribution method according to claim 1, wherein the service level means parameters such a response time and a number of processed requests that must be satisfied as regards the request of the user or computer resource such as a utilization factor of a processor of the computer that must be satisfied as regards performance.

4. A computer system comprising:
a plurality of computer resources are assigned to a plurality of services and respective services are operated,
wherein said computer resources, when a service level of a first service included in the plurality of services may not satisfy a requested service level, obtains a requested service level and a predicted service level of a second service which is different from the first service, determines whether the predicted service level of the second service satisfies the requested service level when a portion of computer resource of the second service is assigned to the first service,
when the predicted service level of the second service satisfies the requested service level, determines whether the predicted service level of the first service satisfies the requested service level by assigning the portion of computer resource of the second service and determining the second service which can provide the portion of computer resource to the first service, deprives the portion of computer resource from the determined second service, and assigns the deprived portion of the computer resource to the first service,
wherein the determination whether the service level of the first service included in the plurality of services may not satisfy the requested service level is done by referring an information that provides an event of the first service, a standard value of the event and a schedule for taking action with respect to each event, and
when the predicted service level does not satisfy the requested service level as regards the standard value of the event, outputting a resource assignment request of the computer resources to the first service so as to execute the action along with the schedule for taking action with respect to each event.

5. A computer system according to claim 4, wherein said computer resources, when there are a plurality of second services, determines whether there is a second service which can provide a portion of computer resource by determining whether the predicted service levels satisfy the requested service levels for the plurality of the second services.

6. A computer system according to claim 4, wherein the service level means parameters such a response time and a number of processed requests that must be satisfied as regards the request of the user or computer resource such as a utilization factor of a processor of the computer that must be satisfied as regards performance.

* * * * *